US011997778B2

(12) United States Patent
Tu et al.

(10) Patent No.: US 11,997,778 B2
(45) Date of Patent: May 28, 2024

(54) REPLACEMENT AND REFILL METHOD FOR DROPLET GENERATOR

(71) Applicant: TAIWAN SEMICONDUCTOR MANUFACTURING CO., LTD., Hsinchu (TW)

(72) Inventors: Shih-Yu Tu, Hsinchu County (TW); Han-Lung Chang, Kaohsiung (TW); Hsiao-Lun Chang, Tainan (TW); Li-Jui Chen, Hsinchu (TW); Po-Chung Cheng, Chiayi County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 18/064,156

(22) Filed: Dec. 9, 2022

(65) Prior Publication Data

US 2023/0107078 A1 Apr. 6, 2023

Related U.S. Application Data

(60) Continuation of application No. 17/338,441, filed on Jun. 3, 2021, now Pat. No. 11,528,798, which is a division of application No. 16/548,731, filed on Aug. 22, 2019, now Pat. No. 11,032,897.

(51) Int. Cl.
*H05G 2/00* (2006.01)

(52) U.S. Cl.
CPC ............. *H05G 2/006* (2013.01); *H05G 2/005* (2013.01); *H05G 2/008* (2013.01)

(58) Field of Classification Search
CPC ........ H05G 2/006; H05G 2/005; H05G 2/008; G03F 7/70008
USPC ........................................................ 250/504 R
See application file for complete search history.

(56) References Cited

U.S. PATENT DOCUMENTS

| | | | | |
|---|---|---|---|---|
| 8,764,995 | B2 | 7/2014 | Chang et al. | |
| 8,796,666 | B1 | 8/2014 | Huang et al. | |
| 8,828,625 | B2 | 9/2014 | Lu et al. | |
| 8,841,047 | B2 | 9/2014 | Yu et al. | |
| 8,877,409 | B2 | 11/2014 | Hsu et al. | |
| 9,093,530 | B2 | 7/2015 | Huang et al. | |
| 9,184,054 | B1 | 11/2015 | Huang et al. | |
| 9,256,123 | B2 | 2/2016 | Shih et al. | |
| 9,476,841 | B1 | 10/2016 | Antsiferov | |
| 9,529,268 | B2 | 12/2016 | Chang et al. | |
| 9,548,303 | B2 | 1/2017 | Lee et al. | |
| 2006/0192155 | A1 * | 8/2006 | Algots | H05G 2/006 250/504 R |
| 2014/0261761 | A1 | 9/2014 | Vaschenko | |

(Continued)

FOREIGN PATENT DOCUMENTS

| | | | |
|---|---|---|---|
| TW | 201912263 | A | 4/2019 |
| TW | 201923482 | A | 6/2019 |

*Primary Examiner* — Jason L McCormack
(74) *Attorney, Agent, or Firm* — Maschoff Brennan

(57) ABSTRACT

A method includes following steps. A photoresist-coated substrate is received to an extreme ultraviolet (EUV) tool. An EUV radiation is directed from a radiation source onto the photoresist-coated substrate, wherein the EUV radiation is generated by an excitation laser hitting a plurality of target droplets ejected from a first droplet generator. The first droplet generator is replaced with a second droplet generator at a temperature not lower than about 150° C.

20 Claims, 16 Drawing Sheets

(56) References Cited

U.S. PATENT DOCUMENTS

| | | | | |
|---|---|---|---|---|
| 2019/0150263 | A1 | 5/2019 | Lai et al. | |
| 2019/0150266 | A1* | 5/2019 | Lai | H05G 2/006<br>250/504 R |
| 2020/0107427 | A1* | 4/2020 | Tu | H05G 2/008 |

* cited by examiner

REPLACEMENT AND REFILL METHOD FOR DROPLET GENERATOR

PRIORITY CLAIM AND CROSS-REFERENCE

This application is a continuation application of U.S. patent application Ser. No. 17/338,441, filed Jun. 3, 2021, now U.S. Pat. No. 11,528,798, issued Dec. 13, 2022, which is a divisional application of U.S. patent application Ser. No. 16/548,731, filed Aug. 22, 2019, now U.S. Pat. No. 11,032,897, issued Jun. 8, 2021, all of which are herein incorporated by reference in their entirety.

BACKGROUND

As consumer devices have gotten smaller and smaller in response to consumer demand, the individual components of these devices have necessarily decreased in size as well. Semiconductor devices, which make up a major component of devices such as mobile phones, computer tablets, and the like, have been pressured to become smaller and smaller, with a corresponding pressure on the individual devices (e.g., transistors, resistors, capacitors, etc.) within the semiconductor devices to also be reduced in size. The decrease in size of devices has been met with advancements in semiconductor manufacturing techniques such as lithography.

For example, the wavelength of radiation used for lithography has decreased from ultraviolet to deep ultraviolet (DUV) and, more recently to extreme ultraviolet (EUV). Further decreases in component size require further improvements in resolution of lithography which are achievable using extreme ultraviolet lithography (EUVL). EUVL employs radiation having a wavelength of about 1-100 nm.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
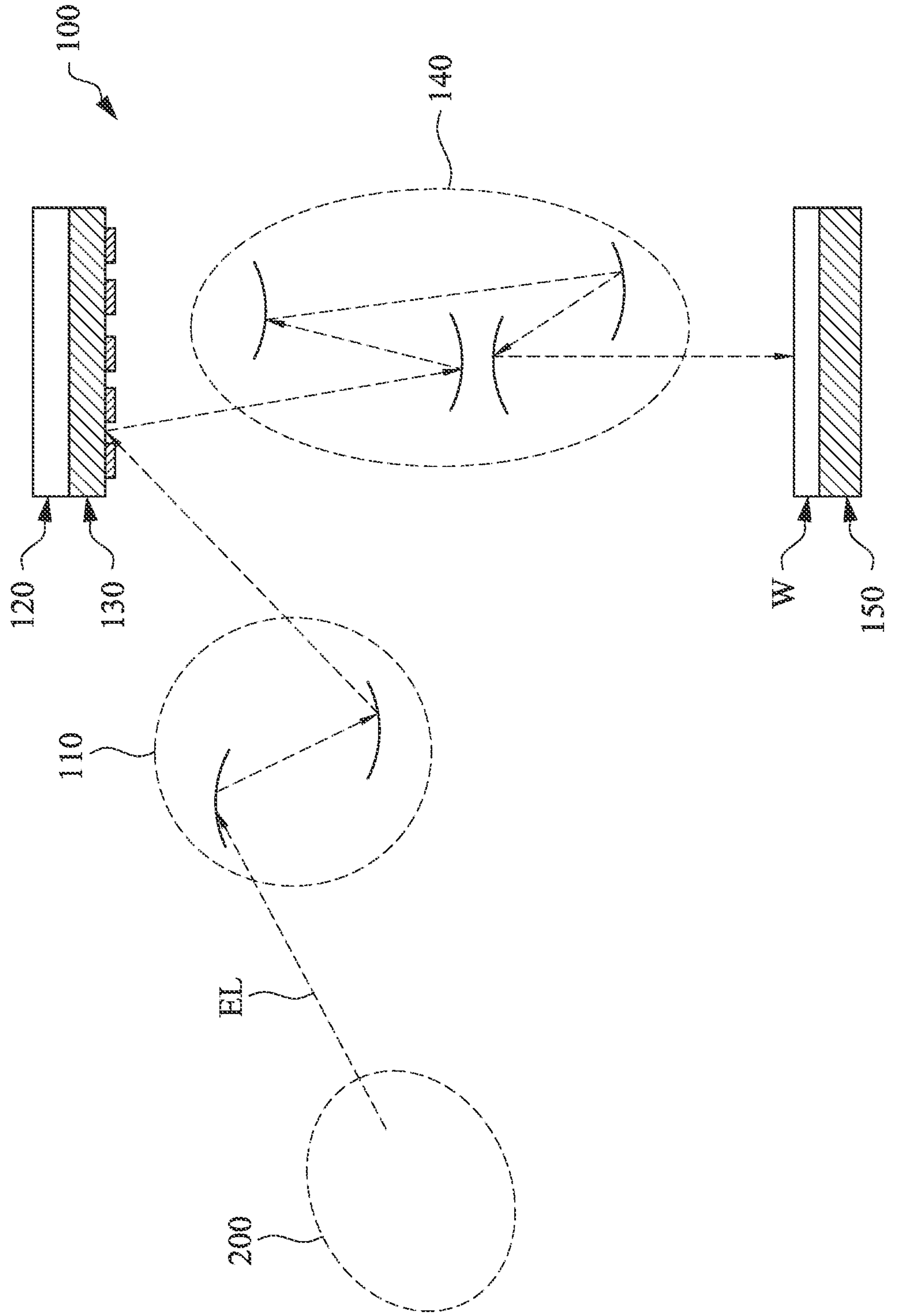
FIG. 1 is a schematic view of a lithography system according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The advanced lithography process, method, and materials described in the current disclosure can be used in many applications, including fin-type field effect transistors (FinFETs). For example, the fins may be patterned to produce a relatively close spacing between features, for which the above disclosure is well suited. In addition, spacers used in forming fins of FinFETs can be processed according to the above disclosure.

Embodiments of the present disclosure generally relate to extreme ultraviolet (EUV) lithography systems and methods. More particularly, it is related to EUV lithography tools and methods of refilling a droplet generator (DG) and/or replacing (i.e., swapping) a droplet generator in the EUV lithography tool with another droplet generator. In an EUV lithography tool, a laser-produced plasma (LPP) generates extreme ultraviolet radiation which is used to image a photoresist coated substrate. In an EUV lithography tool, an excitation laser heats metal (e.g., tin, lithium, etc.) target droplets to ionize the droplets to plasma which emits the EUV radiation. For reproducible generation of EUV radiation, the target droplets arriving at the focal point (also referred to herein as the "zone of excitation") have substantially the same size and arrive at the zone of excitation at the same time as an excitation pulse from the excitation laser arrives.

FIG. 1 is a schematic view of an EUV lithography tool system 100 according to some embodiments of the present disclosure. In some embodiments, the EUV lithography system 100 is designed to expose a resist layer using EUV light (or EUV radiation). The resist layer is a material sensitive to the EUV light. The EUV lithography tool 100 employs a radiation source 200 to generate EUV light EL, such as EUV light having a wavelength ranging between about 1 nm and about 100 nm. In some embodiments, the EUV light EL has a wavelength range centered at about 13.5 nm. Accordingly, the radiation source 200 is also referred to as an EUV radiation source 200. The EUV radiation source 200 may utilize a mechanism of laser-produced plasma (LPP) to generate the EUV radiation, which will be further described later.

The EUV lithography system 100 also employs an illuminator 110. In some embodiments, the illuminator 110 includes various reflective optics, such as a single mirror or a mirror system having multiple mirrors, so as to direct the light EL from the radiation source 200 onto a mask 130 secured on a mask stage 120.

In some embodiments, the mask stage 120 includes an electrostatic chuck (e-chuck) used to secure the mask 130. In this context, the terms mask, photomask, and reticle are used interchangeably. In the present embodiment, the mask 130 is a reflective mask. One exemplary structure of the mask 130 includes a substrate with a low thermal expansion material (LTEM). For example, the LTEM may include $TiO_2$ doped SiO2, or other suitable materials with low thermal expansion. The mask 130 includes a reflective multi-layer (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light EL. The mask 130 may further include a capping layer, such as ruthenium (Ru), disposed on the ML for protection. The mask 130 further includes an absorption layer, such as a tantalum boron nitride (TaBN) layer, deposited over the ML. The absorption layer is patterned to define a layer of an integrated circuit (IC). The mask 130 may have other structures or configurations in various embodiments.

The EUV lithography system 100 also includes a projection optics module (or projection optics box (POB)) 140 for imaging the pattern of the mask 130 onto a semiconductor substrate W (e.g., wafer) secured on a substrate stage (e.g., wafer stage) 150 of the EUV lithography system 100. The POB 140 includes reflective optics in the present embodiment. The EUV light EL that is directed from the mask 130 and carries the image of the pattern defined on the mask 130 is collected by the POB 140. The illuminator 110 and the POB 140 may be collectively referred to as an optical module of the EUV lithography system 100. In the present embodiment, the semiconductor substrate W is a semiconductor wafer, such as a silicon wafer or other type of wafer to be patterned. The semiconductor substrate W is coated with a resist layer sensitive to the EUV light EL in the present embodiment. Various components including those described above are integrated together and are operable to perform EUV lithography exposing processes.

Figure 2:
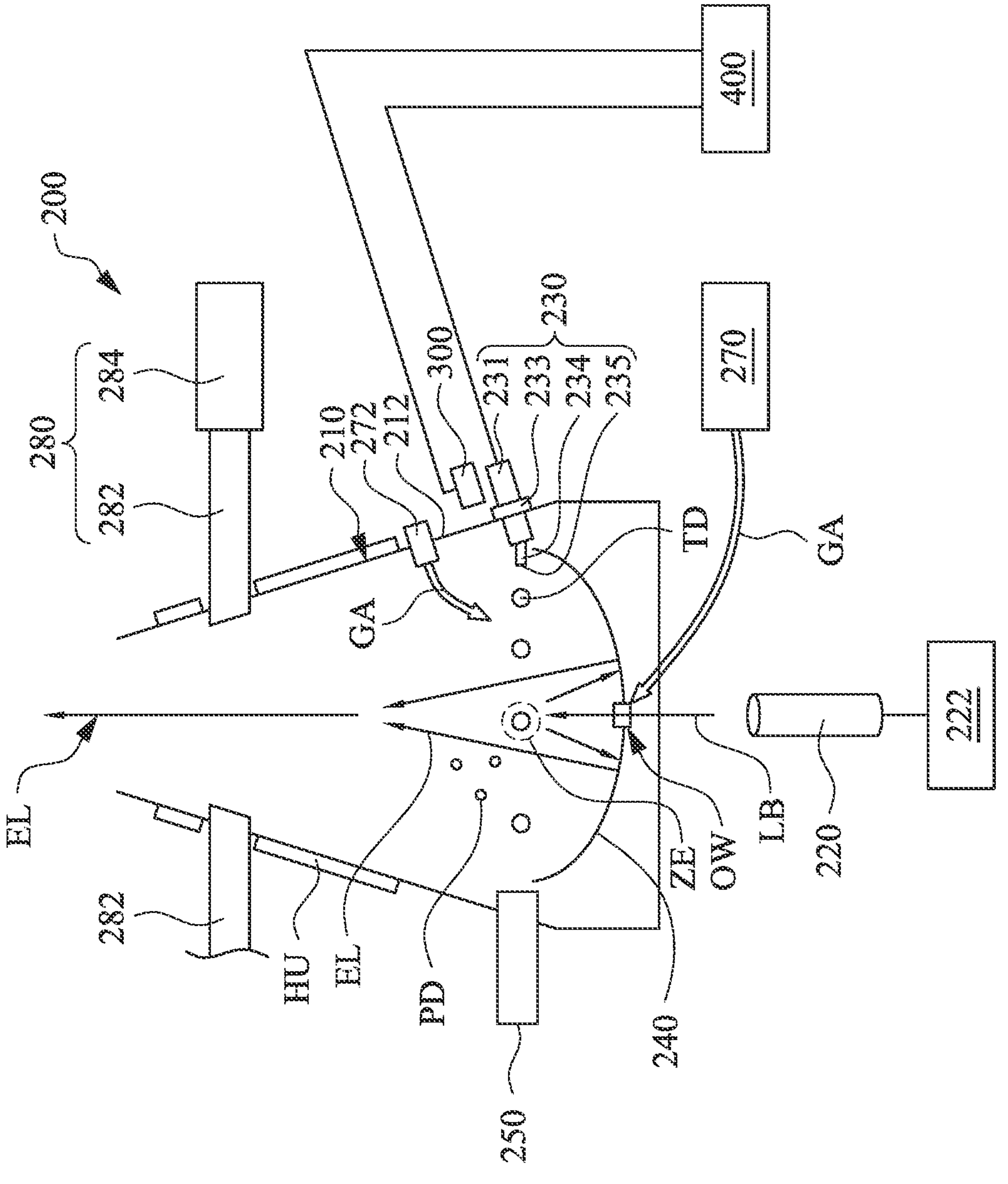
FIG. 2 is a schematic view of an EUV radiation source according to some embodiments of the present disclosure.

FIG. 2 is a schematic view of an EUV radiation source 200 according to some embodiments of the present disclosure. The radiation source 200 employs a laser produced plasma (LPP) mechanism to generate plasma and further generate EUV light from the plasma. The radiation source 200 includes a vessel 210, a laser source 220, a target droplet generator 230, a collector 240, and a droplet catcher 250.

In some embodiments, the target droplets TD are metal droplets, such as droplets of tin (Sn), lithium (Li), or an alloy of Sn and Li. In some embodiments, the target droplets TD each have a diameter in a range from about 10 microns (μm) to about 100 μm. For example, in an embodiment, the target droplets TD are tin droplets, having a diameter of about 10 μm to about 100 μm. In other embodiments, the target droplets TD are tin droplets having a diameter of about 25 μm to about 50 μm. In some embodiments, the target droplets TD are supplied through a nozzle 235 of the droplet generator 230 at a rate in a range from about 50 droplets per second (i.e., an ejection-frequency of about 50 Hz) to about 50,000 droplets per second (i.e., an ejection-frequency of about 50 kHz). In some embodiments, the target droplets TD are supplied at an ejection-frequency of about 100 Hz to about 25 kHz. In other embodiments, the target droplets TD are supplied at an ejection frequency of about 500 Hz to about 10 kHz. The target droplets TD are ejected through the nozzle 235 and into a zone of excitation ZE at a speed in a range of about 10 meters per second (m/s) to about 100 m/s in some embodiments. In some embodiments, the target droplets TD have a speed of about 10 m/s to about 75 m/s. In other embodiments, the target droplets TD have a speed of about 25 m/s to about 50 m/s.

In some embodiments, an excitation laser LB generated by the excitation laser source 220 is a pulse laser. The excitation laser LB is generated by the excitation laser source 220. In some embodiments, the laser source 220 includes a carbon dioxide ($CO_2$) or a neodymium-doped yttrium aluminum garnet (Nd:YAG) laser source with a wavelength in the infrared region of the electromagnetic spectrum. For example, the laser source 220 has a wavelength of 9.4 μm or 10.6 μm, in an embodiment.

In some embodiments, the excitation laser LB includes a pre-heat laser and a main laser. In such embodiments, the pre-heat laser pulse (interchangeably referred to herein as the "pre-pulse) is used to heat (or pre-heat) a given target droplet to create a low-density target plume with multiple smaller droplets, which is subsequently heated (or reheated) by a pulse from the main laser, generating increased emission of EUV light.

In some embodiments, the pre-heat laser pulses have a spot size about 100 μm or less, and the main laser pulses have a spot size in a range of about 150 μm to about 300 μm. In some embodiments, the pre-heat laser and the main laser pulses have a pulse-duration in the range from about 10 ns to about 50 ns, and a pulse-frequency in the range from about 1 kHz to about 100 kHz. In some embodiments, the pre-heat laser and the main laser have an average power in the range from about 1 kilowatt (kW) to about 50 kW. The pulse-frequency of the excitation laser LB is matched with the ejection-frequency of the target droplets TD in some embodiments.

The excitation laser LB is directed through a window OW in the collector 240 into the zone of excitation ZE. The window OW is made of a suitable material substantially transparent to the excitation laser LB. The generation of the pulse lasers is synchronized with the ejection of the target droplets TD through the nozzle 235. As the target droplets TD move through the excitation zone ZE, the pre-pulses heat the target droplets TD and transform them into low-density target plumes. A delay between the pre-pulse and the main pulse is controlled to allow the target plume to form and to expand to an optimal size and geometry. In some embodiments, the pre-pulse and the main pulse have the same pulse-duration and peak power. When the main pulse heats the target plume, a high-temperature plasma is generated. The plasma emits EUV radiation EL, which is collected by the collector mirror 240. The collector 240 further reflects and focuses the EUV radiation EL toward the illuminator 110 (as shown in FIG. 1) for the lithography exposing processes. The droplet catcher 250 is used for catching excessive target droplets. For example, some target droplets may be purposely missed by the laser pulses.

In some embodiments, the collector 240 is designed with a proper coating material and shape to function as a mirror for EUV collection, reflection, and focusing. In some embodiments, the collector 240 is designed to have an ellipsoidal geometry. In some embodiments, the coating material of the collector 240 is similar to the reflective multilayer of the EUV mask 130 (as shown in FIG. 1). In some embodiments, the coating material of the collector 240 includes a ML (such as one or more Mo/Si film pairs) and may further include a capping layer (such as Ru) coated on the ML to substantially reflect the EUV light EL. In some embodiments, the collector 240 may further include a grating structure designed to effectively scatter the laser beam directed onto the collector 240. For example, a silicon nitride layer is coated on the collector 240 and is patterned to have a grating pattern.

In some embodiments, the high-temperature plasma may cool down and become vapors or small particles (collectively, debris) PD. The debris PD may deposit onto the surface of the collector 240, thereby causing contamination thereon. Over time, the reflectivity of the collector 240 degrades due to debris accumulation and other factors such as ion damages, oxidation, and blistering. Once the reflectivity is degraded to a certain degree, the collector 240 reaches the end of its usable lifetime and may need to be swapped out (i.e., replaced with a new collector).

The vessel 210 has a cover 212 for ventilation and for collecting debris PD. In some embodiments, the cover 212 is made of a suitable solid material, such as stainless steel. The cover 212 is designed and disposed around the collector 240. The cover 212 may include a plurality of vanes, which are evenly spaced around the cone-shaped cover 212. In some embodiments, the radiation source 200 further includes a heating unit HU disposed around part of the cover 212. The heating unit HU functions to maintain the temperature inside the cover 212 above a melting point of the debris PD so that the debris PD does not solidify on the inner surface of the cover 212. When the debris PD vapor comes in contact with the vanes, it may condense into a liquid form and flow into a lower section of the cover 212. The lower section of the cover 212 may provide holes (not shown) for draining the debris liquid out of the cover 212.

In some embodiments, a buffer gas GA is supplied from a first buffer gas supply 270 through the aperture in collector 240 by which the pulse laser is delivered to the tin droplets. In some embodiments, the buffer gas is $H_2$, He, Ar, $N_2$ or another inert gas. In certain embodiments, H radicals generated by ionization of the $H_2$ buffer gas is used for cleaning purposes. The buffer gas GA can also be provided through one or more second buffer gas supplies 272 toward the collector 240 and/or around the edges of the collector 240. Further, the vessel 210 further includes an exhaust system 280 so that the buffer gas is exhausted outside the vessel 210.

Hydrogen gas has low absorption to the EUV radiation. Hydrogen gas reaching the coating surface of the collector 240 reacts chemically with a metal of the droplet forming a hydride, e.g., metal hydride. When tin (Sn) is used as the droplet TD, stannane ($SnH_4$), which is a gaseous byproduct of the EUV generation process, is formed. The gaseous $SnH_4$ is then pumped out through the exhaust system 280.

The buffer gas GA is provided for various protection functions, which include effectively protecting the collector 240 from the contaminations by tin particles. Other suitable gas may be alternatively or additionally used. The gas GA may be introduced into the collector 240 through openings (or gaps) near the output window OW through one or more gas pipelines. The exhaust system 280 includes one or more exhaust lines 282 and one or more pumps 284. The exhaust line 282 is connected to the wall of the vessel 210 for receiving the exhaust. In some embodiments, the cover 212 is designed to have a cone shape with its wide base integrated with the collector 240 and its narrow top section facing the illuminator 110 (FIG. 1). To further these embodiments, the exhaust line 282 is connected to the cover 212 at its top section. Installing the exhaust line 282 at the top section of the cover 212 helps exhaust the debris PD out of the space defined by the collector 240 and the cover 212. The space in the vessel 210 is maintained in a vacuum environment since the air absorbs the EUV radiation.

In the present embodiments, a temperature control system 300 may be arranged adjacent to or connected to the droplet generator 230, in which the temperature control system 300 is at least configured for cooling the droplet generator 230. In some embodiments, the temperature control system 300 may be configured for cooling and/or heating the droplet generator 230, which will be discussed in greater detail below.

Figure 3:
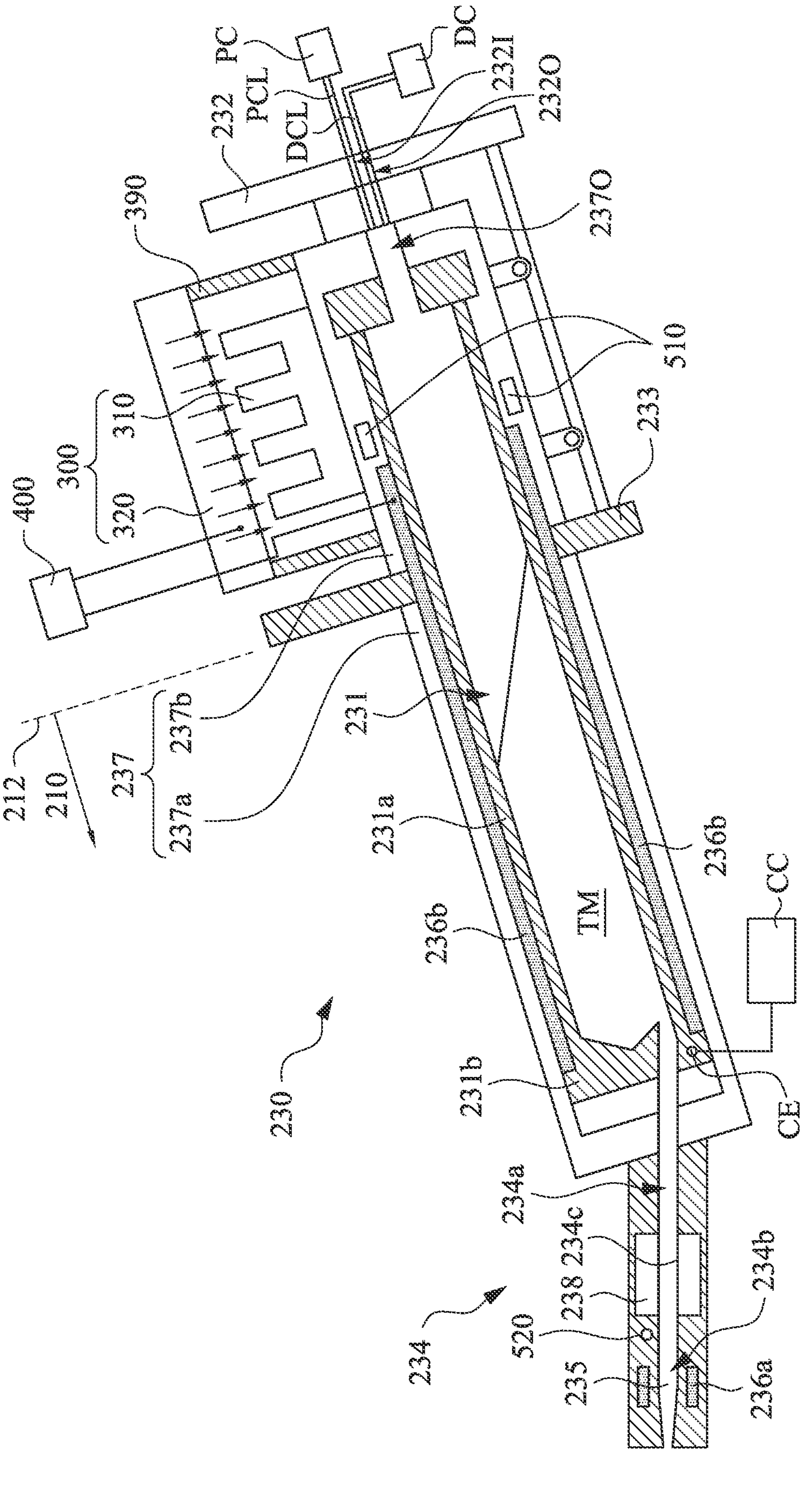
FIG. 3 is a schematic view of a droplet generator assembly according to some embodiments of the present disclosure.

FIG. 3 is a schematic view of a droplet generator assembly according to some embodiments of the present disclosure. The droplet generator assembly includes the droplet generator 230 and the temperature control system 300. The droplet generator 230 includes a reservoir 231, a cover 232, a capillary tube 234, heating elements 236*a* and 236*b*, and an outer shell 237. The elements of the droplet generator 230 can be added to or omitted in certain embodiments.

The reservoir 231 is configured for holding the target material TM. The reservoir 231 may include a sidewall 231*a* and a bottom surface 231*b*. The sidewall 231*a* may be made of steel (e.g., stainless steel) or other suitable thermal conductive material. The sidewall 231*a* surrounds the outer edge of the bottom wall 231*b* and extends away from the bottom surface 231*b*. The heating elements 236*b* may surround the reservoir 231 for heating the target material TM and keeping the target material TM at a temperature above a melting point of the target material TM for generating liquid droplets. For example, during irradiating EUV radiation EL using the EUV radiation source 200 (referring to FIG. 2), the temperature of the tin target material TM may be kept in an operable range of about 231° C. to about 300° C., or up to about 2602° C., such that the tin target material TM melts and does not vaporize. The outer shell 237 surrounds the reservoir 231 and the heating elements 236*b*. The outer shell 237 may be made of steel (e.g., stainless steel) or other suitable thermal conductive material. The outer shell 237 may have an inlet 2370 allowing the target material TM to be refilled into the reservoir 231. The cover 232 is connected to the upper end of the outer shell 237 for covering the inlet 2370, and the cover 232 may be detachable from the outer shell 237. As a result, when the droplet generator 230 is to be refilled, the cover 232 can be detached from the outer shell 237 to open the inlet 2370, so as to allow a new bar-shaped solid target material to be inserted into the droplet generator 230 through the inlet 2370.

In some embodiments, a gas inlet 2321 and a gas outlet 2320 are formed on the cover 232. The gas inlet 2321 is connected to a gas line PCL for introducing pumping gas, such as argon, into the reservoir 231. For example, a pressurizing device PC is configured to supply gas into the reservoir 231 through the gas line PCL. The gas outlet 2320 is connected to a depressurizing device DC (e.g., a pump) though another gas line DCL for pumping out the gas from the reservoir 231. By controlling the gas flow in the gas lines PCL and DCL connected to the gas inlet 2321 and the gas outlet 2320, the pressure in the reservoir 231 can be controlled. For example, when the pressurizing device PC is turned on and the depressurizing device DC is turned off, the pressure in the reservoir 231 increases. As a result, the molten target material TM in the reservoir 231 can be forced out of the reservoir 231 into the capillary tube 234 by the increased gas pressure, and thus the molten target material TM can flow through the capillary tube 234 establishing a continuous stream which subsequently breaks into one or more target droplets TD (as shown in FIG. 2) exiting the nozzle 235 at the end of the capillary tube 234.

The capillary tube 234 is fluidly communicated with the reservoir 231 and the nozzle 235. In greater detail, the capillary tube 234 includes a first end 234*a* closest to the reservoir 231, a second end 234*b* farthest from the reservoir 231, and a sidewall 234*c* between the first and second ends 234*a* and 234*b*. A nozzle 235 is at the second end 234*b* farthest from the reservoir 231. Ejecting the target droplets TD (as shown in FIG. 2) from the nozzle 235 can be controlled by an actuator such as a piezoelectric actuator 238 surrounding the capillary tube 234. In some embodiments, the heating elements 236*a* surrounding the capillary tube 234 heats the target material TM and keeps the target material TM at a temperature above the melting point of the target material TM for generating the liquid droplets.

In some embodiments, the droplet generator 230 includes a holder 233 encircling the outer shell 237, and the outer shell 237 has an interior portion 237*a* and an exterior portion 237*b* on opposite sides of the holder 233. The temperature control system 300 is at least partially over the exterior portion 237*b* of the outer shell 237. When the droplet generator 230 is inserted into the vessel 210 of the radiation source 200 (as shown in FIG. 2), the holder 233 presses against an outer surface of the cover 212 of the vessel 210 in an airtight manner. For example, the dashed line in FIG. 3 indicates an outer edge of the cover 212 when the droplet generator 230 is inserted into the vessel 210. To be specific, when the droplet generator 230 is inserted into the vessel 210, a portion of the reservoir 231, the interior portion 237*a* of the outer shell 237 and the capillary tube 234 are inside the vessel 210, while the other portion of the reservoir 231, the exterior portion 237*b* of the outer shell 237, the holder 233, and the temperature control system 300 are outside the vessel 210.

A prevention maintenance (PM) operation for the droplet generator 230 is performed, for example, on a weekly basis. In some embodiments, the PM operation at least includes depressurizing the droplet generator 230, cooling down the target material TM in the droplet generator 230 to a room temperature (from about 25° C. to about 40° C.), opening the droplet generator 230, refilling the reservoir 231 of the droplet generator 230 with a bar-shaped solid target material TM (e.g., tin bar), closing the droplet generator 230, and reheating the target material TM to a temperature above the melting point of the target material TM (about 231° C. for tin).

The PM operation, however, is time-consuming because it takes several hours to naturally cool down the droplet generator 230 to the room temperature and to then reheat the refilled droplet generator 230 from the room temperature to the temperature above the melting point of the target material TM. The time-consuming PM operation would thus reduce throughput of the EUV lithography processes.

As a result, in some embodiments of the present disclosure, when the droplet generator 230 is to be refilled, the droplet generator 230 is cooled down to a target temperature above room temperature. In greater detail, the droplet generator 230 is cooled down to a target temperature lower than the melting point (about 231° C.) of the target material TM (e.g., tin) but not lower than about 150° C. In this way, the cooling time duration and the reheating time duration can be effectively reduced, which in turn will improve throughput of the EUV lithography processes. Further, if the droplet generator 230 is cooled down to a target temperature lower than 150° C., the nozzle 235 would suffer from aggravated clogging issues. Moreover, it is observed that the liquid-to-solid phase transition of the target material TM in the droplet generator 230 begins once the temperature reaches about 231° C. and terminates after the temperature reaches about 218° C. As a result, the lower the temperature of the cooling operation terminates, the safer the refilling operation is. It is observed that if cooling operation terminates at a target temperature is higher than about 224° C., the target material TM might not be entirely solidified and thus prone to flow out of the droplet generator 230 during the refilling operation, which in turn would degrade the refilling operation. Therefore, the droplet generator 230 may be cooled down to a target temperature from about 150° C. to about 224° C. In some embodiments, the cooling operation terminates at the target temperature from about 150° C. to about 210° C. In some embodiments, the cooling operation terminates at the target temperature from about 150° C. to about 200° C. In some embodiments, the cooling operation terminates at the target temperature from about 150° C. to about 175° C.

Figure 4:
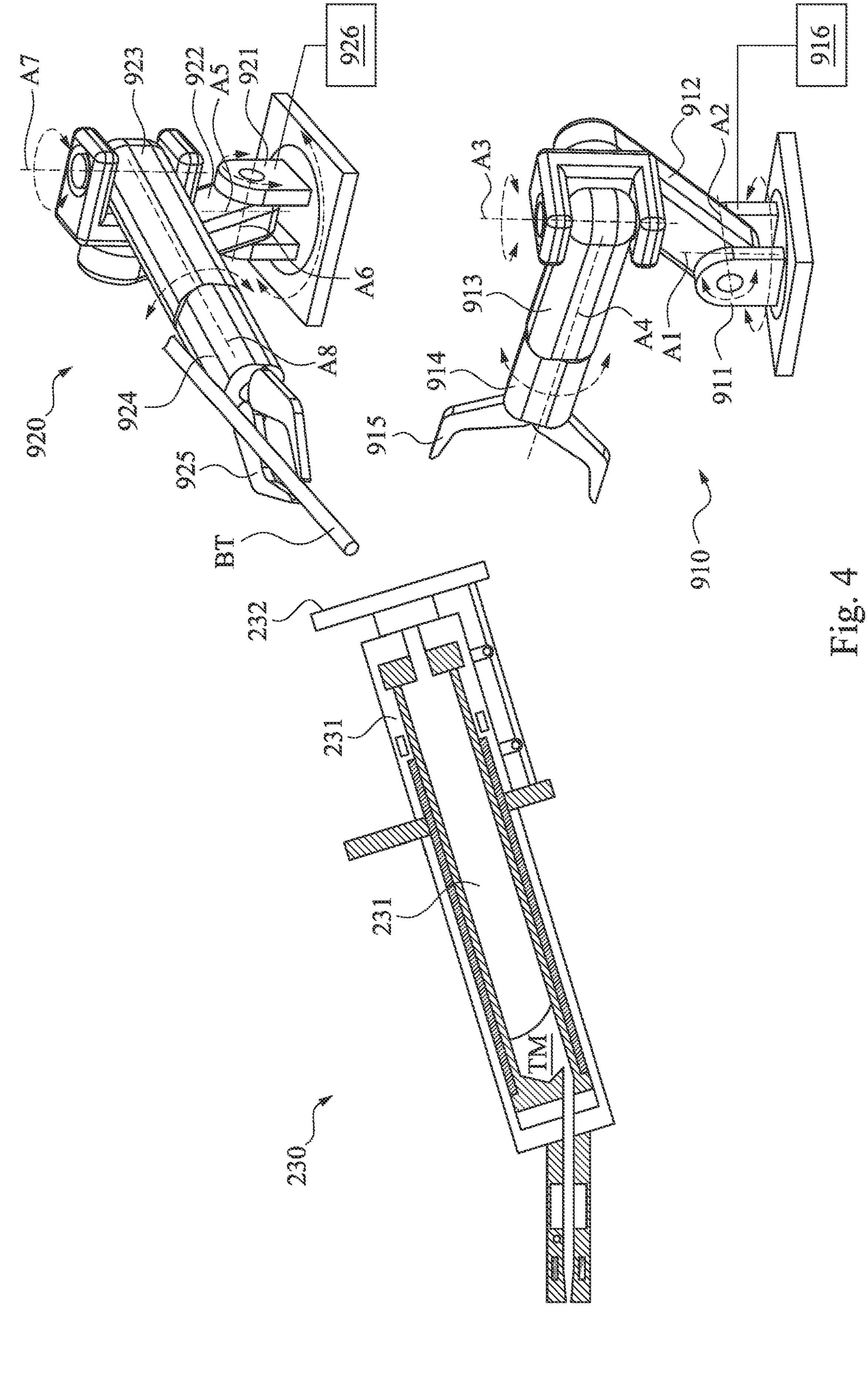
FIG. 4 is a schematic view of robot arms used to refill a droplet generator assembly according to some embodiments of the present disclosure.

Because the cooling operation terminates at the target temperature not lower than 150° C., it may be dangerous for manually opening, refilling and closing the droplet generator 230. Therefore, in some embodiments, one or more robot arms may be employed to automatedly open, refill and/or close the droplet generator 230. Exemplary robot arms 910 and 920 for automatedly opening, refilling and/or closing the droplet generator 230 are shown in FIG. 4, where the DG opening/closing robot arm 910 may be used to open and close the droplet generator 230, and the refilling robot arm 920 may be used to refill the droplet generator 230.

The DG opening/closing robot arm 910 includes a rotatable base 911, a rotatable arm 912, a rotatable forearm 913, a rotatable wrist member 914, a gripper 915 and a robot controller 916. Rotations of the base 911, the arm 912, the forearm 913 and the wrist member 914 are controlled by the robot controller 916 in such a way that the gripper 915 can be moved in a three-dimensional manner. As a result, in an operation of opening the droplet generator 230, the gripper 915 can be moved to grip the cover 232 and then unfasten the cover 232 from the outer shell 237 of the droplet generator 230. On the other hand, in an operation of closing the droplet generator 230, the gripper 915 gripping the cover 232 can be moved back to the droplet generator 230 and then fasten the cover 232 to the outer shell 237.

Similar to the DG opening/closing robot arm 910, the refilling robot arm 920 includes a rotatable base 921, a rotatable arm 922, a rotatable forearm 923, a rotatable wrist member 924, a gripper 925 and a robot controller 926. Rotations of the base 921, the arm 922, the forearm 923 and the wrist member 924 are controlled by the robot controller 926 in such a way that the gripper 925 can be moved in a three-dimensional manner. As a result, the gripper 925 gripping a bar-shaped solid target material BT (e.g., tin bar) can be moved to the opened droplet generator 230 and insert the bar-shaped solid target material BT into the reservoir 231.

In some embodiments, the robot controllers 916 and 926 are programmed to opening, refilling and closing the droplet generator 230 in sequence. For example, the droplet generator 230 is opened using the DG opening/closing robot arm 910 at first, and then refilled using the refilling robot arm 920, followed by closing the droplet generator 230 using the DG opening/closing robot 910. In some embodiments, the robot arms 910 are independently controlled. In other words, the robot arm 910 is free from control by the robot controller 926, and the robot arm 920 is free from control by the robot controller 916.

In some embodiments, the robot controllers 916 and 926 may include processors, central processing units (CPU), multi-processors, distributed processing systems, application specific integrated circuits (ASIC), or the like. In some embodiments, the robot controllers 916 and 926 are in a same processor. In some other embodiments, the robot controllers 916 and 926 are in different individual processors, respectively.

Example rotation of the DG opening/closing robot arm 910 is illustrated in FIG. 4. The base 911 is rotatable about an axis A1, the arm 912 is connected to the base 911 through a rotational joint or a pivotal joint in such a way that the arm 912 is rotatable about an axis A2 perpendicular to the axis A1. The forearm 913 is connected to the arm 912 through a rotational joint or a pivotal joint in such a way that the forearm 913 is rotatable about an axis A3 parallel with the axis A1. The wrist member 914 is connected to the forearm 913 through a rotational joint or a pivotal joint in such a way that the wrist member 914 is rotatable about an axis A4 perpendicular to the axes A1-A3. The gripper 915 is connected to an end of the wrist member 914 farthest from the forearm 913, so that the gripper 915 can be moved in a three-dimensional manner by using rotational motions performed by the base 911, the arm 912, the forearm 913 and the wrist member 914.

Also illustrated in FIG. 4 is example rotation of the refilling robot arm 920. The base 921 is rotatable about an axis A5 parallel to the axis A1, the arm 922 is connected to the base 921 through a rotational joint or a pivotal joint in such a way that the arm 922 is rotatable about an axis A6 perpendicular to the axis A5. The forearm 923 is connected to the arm 922 through a rotational joint or a pivotal joint in such a way that the forearm 923 is rotatable about an axis A7 parallel with the axis A5. The wrist member 924 is connected to the forearm 923 through a rotational joint or a pivotal joint in such a way that the wrist member 924 is rotatable about an axis A8 perpendicular to the axes A5-A7. The gripper 925 is connected to an end of the wrist member 924 farthest from the forearm 923, so that the gripper 925 can be moved in a three-dimensional manner by using rotational motions performed by the base 921, the arm 922, the forearm 923 and the wrist member 924.

In some embodiments, the grippers 915 and 925 are made of a material having a melting point higher than the melting point (about 231° C.) of the target material TM (e.g., tin), so that opening/refilling/closing operations of the droplet generator 230 can be performed using the grippers 915 and 925 as long as the target material TM in the droplet generator 230 starts solidifying. For example, the grippers 915 and 925 can be made of stainless steel or other suitable materials that can remain in a solid-phase at the temperature higher than the melting point of the target material TM. In some embodiments, the opening/refilling/closing operations of the droplet generator 230 are performed in a low oxygen and low moisture environment, because the nozzle 235 of the droplet generator 230 may be damaged by oxygen and moisture during the opening/refilling/closing operations. For example, the opening/refilling/closing operations of the droplet generator 230 may be performed in a vacuum environment (i.e., oxygen-free and moisture-free environment). In greater detail, the atmosphere around the droplet generator 230 may be vacuumed by a vacuum pump (not shown) before performing opening/refilling/closing operations. In this way, oxygen and moisture can be drawn away from the atmosphere around the droplet generator 230 by the vacuum pump, which in turn will protect the nozzle 235 from the damages caused by the oxygen and moisture, thus extending lifetime of droplet generator 230.

Although the embodiments depicted in FIG. 4 use robot arms 910 and 920 to automatedly open, refill and close the droplet generator 230, in some other embodiments the droplet generator 230 can be opened, refilled and closed manually by one or more experienced human users, for example, technicians and/or engineers. In such embodiments, the experienced human user may use one or more thermal insulating tools to manually open, refill and close the droplet generator 230.

Cooling down the droplet generator 230 can be performed using the temperature control system 300, as illustrated in FIG. 3. In some embodiments of the present disclosure, the temperature control system 300 is disposed adjacent to the reservoir 231 for cooling down the droplet generator 230. The temperature control system 300 may include a passive heat dissipation device (e.g., a heat sink 310) and an active heat dissipation device (e.g., a fan 320). The heat sink 310 is capable of absorbing heats of the reservoir 231 and dissipates the heat by its fins. For example, the heat sink 310 may be mounted on the exterior portion 237*b* of the outer shell 237. In some embodiments, the heat sink 310 is in contact with the exterior portion 237*b* of the outer shell 237. The fan 320 may be fixed with respect to the droplet generator 230. For example, the temperature control system 300 may include a bracket 390 supports the fan 320 and connects the fan 320 to the outer shell 237. The fan 320 is disposed adjacent to the fins of the heat sink 310 for generating gas flow to accelerate the heat dissipation. In some embodiments, the gas flow may be in a direction normal to the exterior portion 237*b* of the outer shell 237. In some embodiments, the gas flow may be in a direction inclined with respect to the exterior portion 237*b* of the outer shell 237. Exemplary fan 320 may be a single fan, a multi fan (e.g., a double fan, a triple fan, or a quadruple fan), an industry-fan, a high-power Fan, or a Turbo Fan. In some embodiments, the droplet generator 230 may optionally include a temperature control circuit or controller 400 electrically connected to the heating elements 236*a* and 236*b* and the fan 320 for controlling the temperature of the droplet generator 230 (e.g., for controlling cooling operation and/or reheating operation of the droplet generator 230). In some other embodiments, the passive heat dissipation device (e.g., a heat sink 310) can be omitted. In some other embodiments, the active heat dissipation device (e.g., the fan 320) can be omitted.

Through the configuration of the temperature control system 300, the cooling operation of the target material TM can be accelerated, and thus the PM operation can take less time duration. For example, the PM operation performed with the temperature control system 300 takes about 2 hours to about 3 hours less than a PM operation performed without the temperature control system 300. Moreover, due to the shortened PM time duration, contaminations or particles falling in the vessel 210 and/or on the collector 240 caused by the PM operation can be effectively reduced. Furthermore, due to the shortened PM time duration, unwanted oxidation of the target material TM caused by oxygen-containing gases (e.g., $O_2$, $H_2O$) during the PM operation can be reduced as well.

In some embodiments, the droplet generator 230 may further include sensors 510 located adjacent to the reservoir 231. For example, the sensors 510 are between the exterior portion 237*b* of the outer shell 237 and the sidewall 231*a* of the reservoir 231. In some embodiments, the droplet generator 230 may further include sensors 520 near the tube 234. The sensors 510 and 520 may detect a condition of the droplet generator 230, such as a pressure condition, a temperature condition, or the like. The temperature controller 400 is electrically connected with the sensors 510, 520. In this way, the detected conditions can be fed forward to the temperature controller 400, and thus the temperature controller 400 can start or stop cooling down the droplet generator 230 based on the detected conditions. Similarly, the temperature controller 400 can start or stop heating the droplet generator 230 based on the detected conditions. In some embodiments, the temperature controller 400 may include a processor, a central processing unit (CPU), a multi-processor, a distributed processing system, an application specific integrated circuit (ASIC), or the like.

In some embodiments, the droplet generator 230 may optionally include a charging circuit CC configured for charging ions into the droplet generator 230. The charging circuit CC may include an electrode CE positioned at the bottom wall 231*b* of the reservoir 231. The electrode CE is connected to ground or connected to a power supply. However, it is appreciated that many variations and modifications can be made to embodiments of the disclosure. In some other embodiments, the electrode is omitted, and the bottom wall 231*b* and/or the sidewall 231*a* of the reservoir 231 are made of electrically conductive materials and are electrically connected to ground or connected to the power supply.

Figure 5:
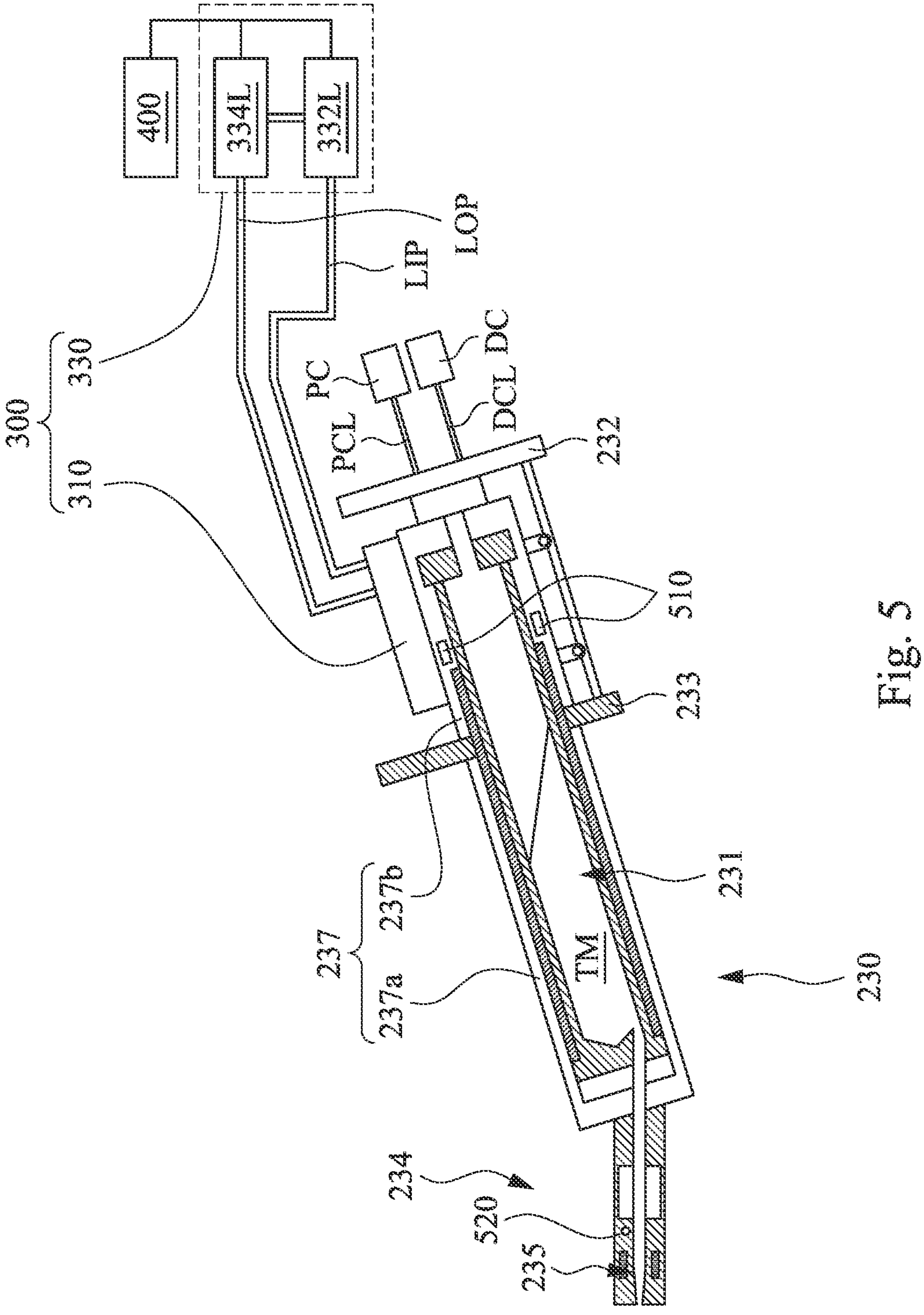
FIG. 5 is a schematic view of a droplet generator assembly according to some embodiments of the present disclosure.

FIG. 5 is a schematic view of a droplet generator assembly according to some embodiments of the present disclosure. The present embodiments are similar to those of FIG. 3, except that the temperature control system 300 as shown in FIG. 5 includes a liquid input pipe LIP, a liquid output pipe LOP, and an active temperature control device 330 fluidly communicated with the liquid input pipe LIP and the liquid output pipe LOP. The temperature control device 330 includes a liquid heating/cooling element 334L and liquid tank 332L, in which the temperature controller 400 is electrically coupled to the heating/cooling element 334L and the liquid tank 332L for controlling the flow of a liquid. The liquid input pipe LIP and the liquid output pipe LOP may be connected with the heat sink 310 or the exterior portion 237*b* of the outer shell 237. The pipes LIP and LOP may wrap the heat sink 310. For example, the pipes LIP and LOP may be between the fins of the heat sink 310. In some embodiments, the pipes LIP and LOP may surround the heat sink 310 helically. The heating/cooling element 334L may draw heat away from the liquid, thereby cooling the liquid. In some embodiments, the fan device (referring to FIG. 3) may be optionally used to accelerate the heat dissipation. In some embodiments, the active temperature control device 330 may further include a pump fluidly communicated with the pipes LIP and LOP for controlling the liquid flow. In some other embodiments, the heat sink 310 may be omitted.

During the cooling down the droplet generator 230 in the PM operation, a liquid stored in the liquid tank 332L is introduced to adjacent the reservoir 231 though the liquid input pipe LIP, and absorbs the heat of the reservoir 231. Then, the liquid is directed to the heating/cooling element 334L. The heating/cooling element 334L remove the heat of the liquid, and send the liquid to the liquid tank 332L. The liquid may be water, polar liquids, fluorinates, low viscosity oils, other organic liquids, molten salts, molten metals, or other suitable thermally conductive liquid. For example, suitable thermally conductive liquid includes a carrier liquid (e.g., water) dispersed with suitable thermally conductive nanoparticles, such as copper oxide, alumina, titanium dioxide, carbon nanotubes, silica, copper, silver rods, or other metals.

In some embodiments, the heating/cooling element 334L is a cooling system, such as a liquid nitride system, a liquid hafnium system, a cryogenics system, or a water cooling system. In some other embodiments, the heating/cooling element 334L is a heating and cooling system, in which the heating/cooling element 334L may heat or cool the liquid. For example, during reheating the droplet generator 230 in the PM operation, the temperature control system 300 may heat the droplet generator 230 by the heating/cooling element 334L. In some other embodiments, the active temperature control device 330 may include a cooling liquid gun ejecting a cooling liquid to the heat sink 310 directly, in which the cooling liquid may absorb the heat of the heat sink 310 and evaporate. For example, the cooling liquid may be water. The cooling liquid gun may be physically separated from the heat sink 310 and the droplet generator 230. In some other embodiments, a pipe (e.g., the pipe LIP) may connect the cooling liquid gun to the heat sink 310, such that the cooling liquid is ejected from the cooling liquid gun to reach the heat sink 310 through the pipe LIP. Other details of the present embodiments are similar to those aforementioned, and not repeated herein.

Figure 6:
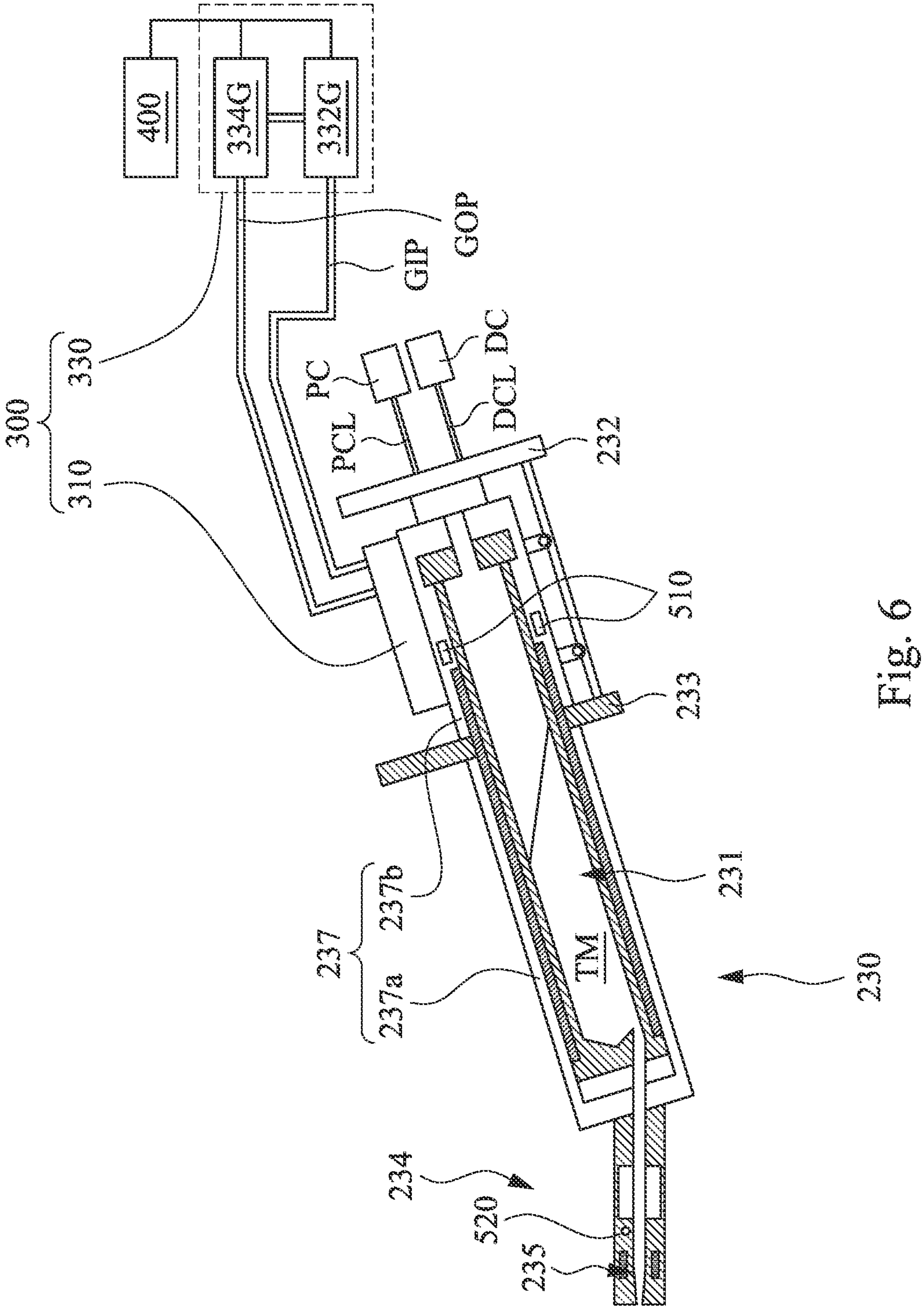
FIG. 6 is a schematic view of a droplet generator assembly according to some embodiments of the present disclosure.

FIG. 6 is a schematic view of a droplet generator assembly according to some embodiments of the present disclosure. The present embodiments are similar to those of FIG. 5, except that the temperature control system 300 as shown in FIG. 6 includes a gas input pipe GIP, a gas output pipe GOP, and an active temperature control device 330 including a gas heating/cooling element 334G and a gas tank 332G. The active temperature control device 330 is fluidly communicated with the gas input pipe GIP and the gas output pipe GOP. The temperature controller 400 is electrically coupled to the heating/cooling element 334G and the gas tank 332G for controlling the flow of a gas. The gas input pipe GIP and the gas output pipe GOP may be in contact with the heat sink 310 or the exterior portion 237*b* of the outer shell 237. The pipes GIP and GOP may wrap the heat sink 310. For example, the pipes GIP and GOP may be between the fins of the heat sink 310. In some embodiments, the pipes GIP and GOP may surround the heat sink 310 helically. During cooling down the droplet generator 230 in the PM operation, a gas stored in the gas tank 332G is introduced to adjacent the reservoir 231 though the gas input pipe GIP, and absorbs the heat of the reservoir 231. Then, the gas is directed to the heating/cooling element 334G through the gas output pipe GOP. The heating/cooling element 334G remove the heat of the gas, and send the gas to the gas tank 332G. The gas may be extreme clean dry air (XCDA). In some embodiments, the gas may be Ar, CO, $CO_2$, H, He, $N_2$, Ne, $O_2$, or other suitable gas. In some embodiments, the fan device (referring to FIG. 3) may be optionally used to accelerate the heat dissipation. In some other embodiments, the heat sink 310 may be omitted.

The heating/cooling element 334G may be a gas thermal exchanger with a compressor, a refrigerant based system (e.g., refrigerator) with a compressor, or the like. For example, by compressing the coolant from a gas state into a liquid state, heat is released from the coolant; by letting the coolant expands from the liquid state into the gas state, the coolant can soak up heat. In some embodiments, the heating/cooling element 334G may be a heating and cooling system, which may conduct a rapid thermal process to reheat the droplet generator 230 after refilling the droplet generator 230. For example, the heating/cooling element 334G may heat the gas coming from the gas output pipe GOP, and the heated gas is sent to the heat sink 310 through the gas input pipe GIP. In some embodiments where a rapid thermal process is conducted, the gas may be water vapor. Other details of the present embodiments are similar to those aforementioned, and not repeated herein. In some other embodiments, the active temperature control device 330 may include a cooling gas gun ejecting cooling gas to the heat sink 310 directly. For example, the cooling gas may be nitrogen. The cooling gas gun may be physically separated from the heat sink 310 and the droplet generator 230. In some other embodiments, a pipe (e.g., the pipe GIP) may connect the cooling gas gun to the heat sink 310, such that the cooling gas is ejected from the cooling gas gun to reach the heat sink 310 through the pipe GIP.

Figure 7:
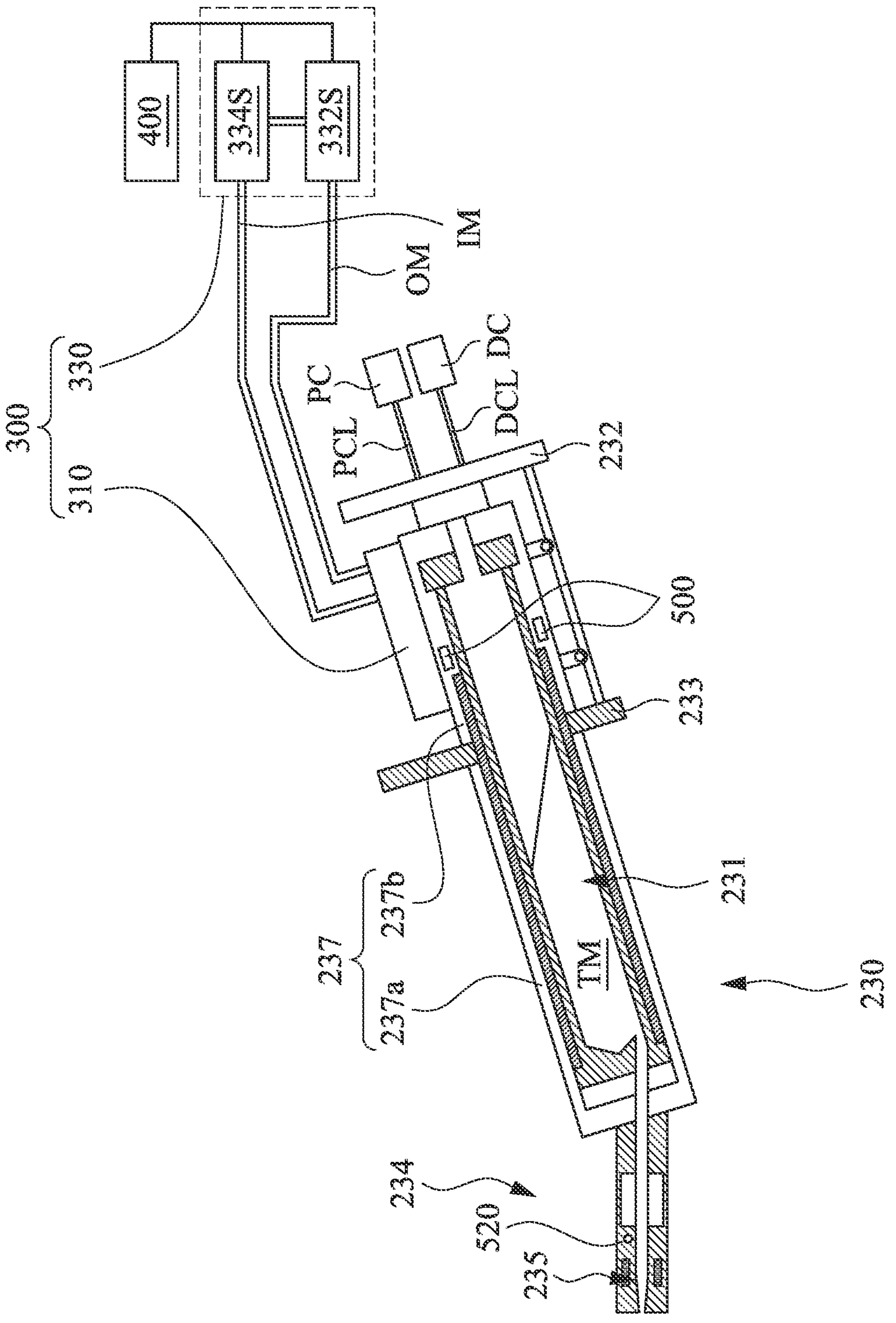
FIG. 7 is a schematic view of a droplet generator assembly according to some embodiments of the present disclosure.

FIG. 7 is a schematic view of a droplet generator assembly according to some embodiments of the present disclosure. The present embodiments are similar to those of FIG. 5, except that the temperature control system 300 in FIG. 7 includes thermal conductive wires IM and OM and an active temperature control device 330 including a solid heating/cooling element 334S and a solid tank 332S. The thermal conductive wires IM and OM may be in contact with the heat sink 310 or the exterior portion 237*b* of the outer shell 237. The wires IM and OM may wrap the heat sink 310. For example, the wires IM and OM may be between the fins of the heat sink 310. In some embodiments, the wires IM and OM may surround the heat sink 310 helically. The thermal conductive wires IM and OM are connected to the solid heating/cooling element 334S and the solid tank 332S. The thermal conductive wires IM and OM may be made of aluminium, alumina, copper, manganese, marble, or their combinations. The solid heating/cooling element 334S may be a thermoelectric cooling module, such as a thermoelectric cooling chip, and a thermoelectric cooler. In some other embodiments, the solid heating/cooling element 334S may be a thermoelectric cooler and heater, a thermal exchanger with a compressor, a refrigerant based system, or the like. The controller 400 is electrically coupled to the solid heating/cooling element 334S and the solid tank 332S for controlling the heat flow and the rates of heating and cooling.

In some embodiments, the wires OM and IM are made of solid conductive material (e.g., aforementioned Cu, A1, or Cu-A1 Alloy). During cooling down the droplet generator 230 in the PM operation, the thermal conductive wires OM and IM absorb the heat of the reservoir 231 and transfer the heat to the solid heating/cooling element 334S. The solid heating/cooling element 334S absorbs and removes the heat of the thermal conductive wire IM, such that the thermal conductive wire IM is capable of continuing absorbing the heat of the reservoir 231. In some embodiments, the passive dissipation device (e.g., the heat sink 310) is thermally coupled to the thermal conductive wire IM and thermal conductive wire OM for drawing heat from the thermal conductive wire IM and thermal conductive wire OM to the ambient, thereby cooling the droplet generator 230. In some other embodiments, the wires OM and IM are composited. For example, the wires OM and IM has a hollow tube surrounding by solid conductive walls, and the hollow tube may accommodate liquid or gas for heat transmission. The composited wires OM and IM may be connected to the solid heating/cooling element 334S and the solid tank 332S, respectively. In some embodiments, the fan device (referring to FIG. 3) may be optionally used to accelerate the heat dissipation. In some other embodiments, the heat sink 310 may be omitted.

In some embodiments, the temperature control system 300 may conduct a rapid thermal process to heat the droplet generator 230. For example, the thermal conductive wire IM/OM can be connected to a heating wire, heating rod, heating piece, or the like. In some embodiments, the solid heating/cooling element 334S may act as a heating and cooling element. Other details of the present embodiments are similar to those aforementioned, and not repeated herein.

Figure 8:
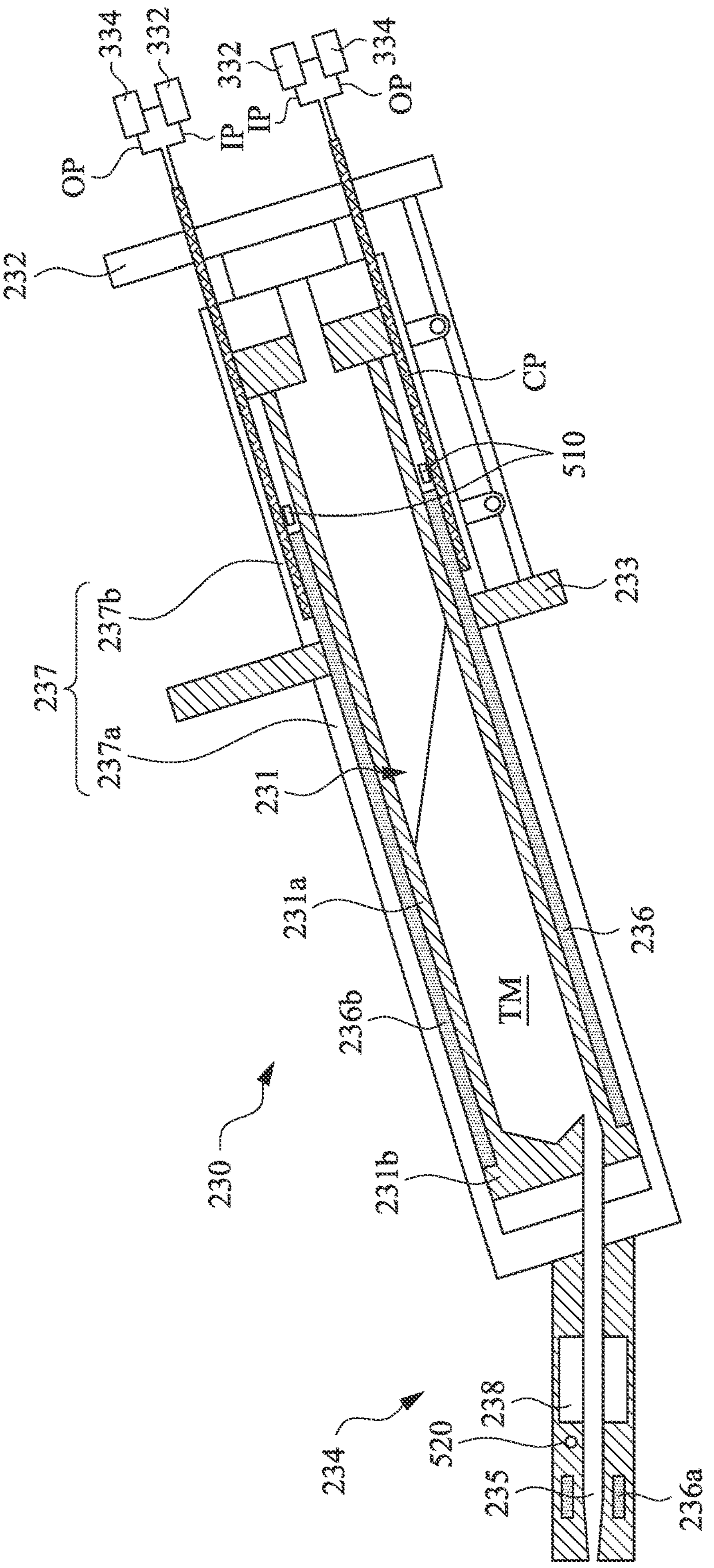
FIG. 8 is a schematic view of a droplet generator assembly according to some embodiments of the present disclosure.

FIG. 8 is a schematic view of a droplet generator assembly according to some embodiments of the present disclosure. The present embodiments are similar to those of FIGS. 5-7, expect that the input pipe IP and the output pipe OP are plugged in between the reservoir 231 and the exterior portion 237*b* of the outer shell 237, as illustrated in FIG. 8. In some embodiments, the input pipe IP and the output pipe OP are surrounded by a thermal conductive cover CP, such that heats in the reservoir 231 may transmit to the input pipe IP through the thermal conductive cover CT. The input/output pipe IP/OP may be in the formed of aforementioned liquid input/output pipe LIP/LOP, gas input/output pipe GIP/GOP, or the thermal conductive wires IM/OM. The input pipe IP and the output pipe OP are connected to the tank 332 (e.g., the liquid, gas, or solid tank 332L, 332G, or 332S) and the heating/cooling element 334 (e.g., the heating/cooling element 334L, 334G, or 334S), respectively. Other details of the present embodiments are similar to those aforementioned, and not repeated herein.

Figure 9:
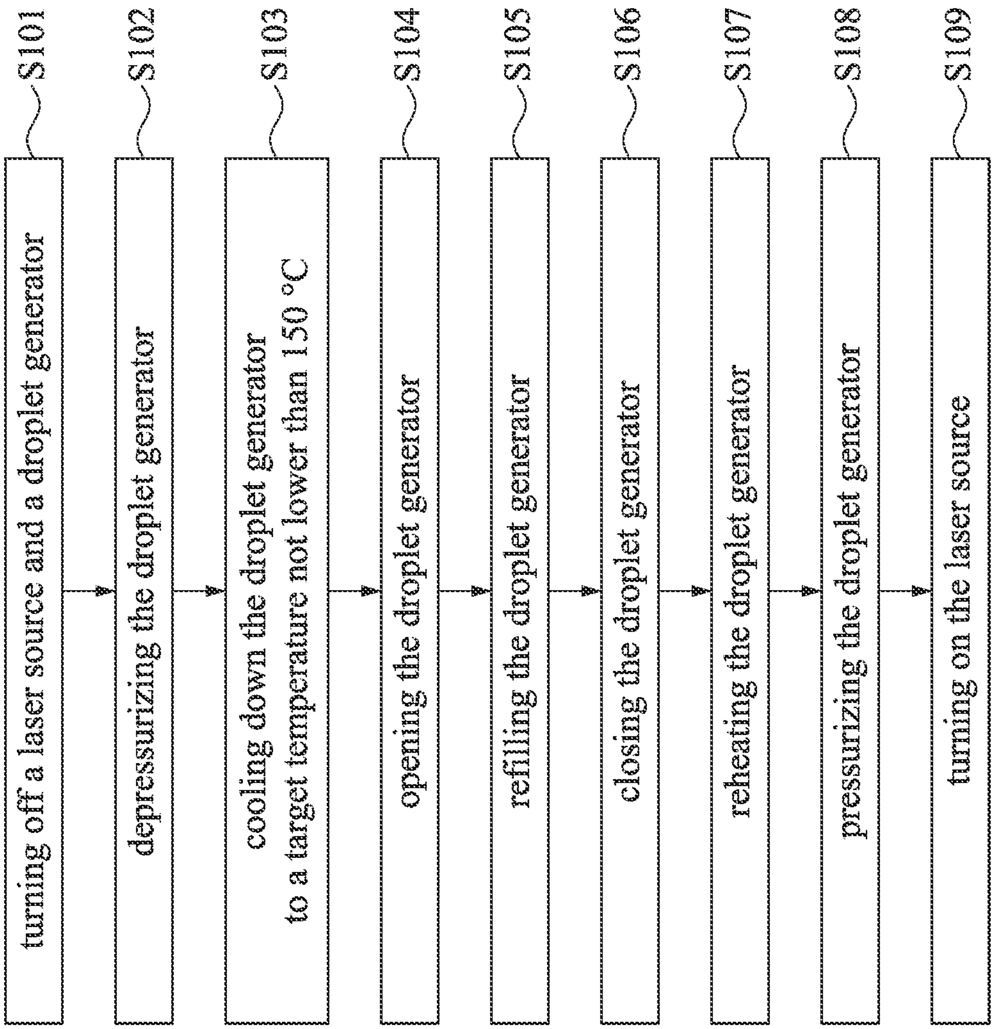
FIG. 9 is a method of a prevention maintenance (PM) operation according to some embodiments of the present disclosure.

FIG. 9 shows a method of a PM operation according to some embodiments of the present disclosure. The illustration is merely exemplary and is not intended to limit beyond what is specifically recited in the claims that follow. It is understood that additional steps may be provided before, during, and after the steps shown by FIG. 9, and some of the steps described below can be replaced or eliminated in additional embodiments of the method. The order of the operations/processes may be interchangeable.

At block S101, the laser source and the droplet generator are turned off. For example, as illustrated in FIG. 2, the laser source 220 is turned off by the laser controller 222, and the droplet generator 230 is turned off by stopping pressurizing the droplet generator 230 by turning off the pressuring device PC as illustrated in FIG. 3. In this way, emission of the excitation laser and ejection of metal droplets are halted, and thus the EUV lithography process is halted. In some embodiments, the turning off operation of the droplet generator 230 is synchronized with the turning off operation of the laser source 220. In some other embodiments, the laser source 220 is turned off after the droplet generator 230 is turned off, so as to prevent unexcited target droplets TD from falling on the collector 240.

At block S102, the droplet generator is depressurized. For example, as illustrated in FIG. 3, the droplet generator 230 can be depressurized by turning on the depressurizing device DC while turning off the pressurizing device PC.

At block S103, the droplet generator is cooled down to a target temperature not lower than 150° C. For example, the droplet generator 230 can be cooled down using the temperature control system 300 as illustrated in FIG. 3, 5, 6, 7 or 8. In some embodiments, the temperature controller 400 is programmed to control the temperature control system 300 to trigger the cooling operation after triggering the depressurizing operation of block S102. In some embodiments, the temperature controller 400 is programmed to control the temperature control system 300 to terminate the cooling operation at the target temperature not lower than 150° C. In some embodiments, the termination of the cooling operation relies upon the detected temperature from the sensors 510 and 520 in the droplet generator 230. In particular, the cooling operation terminates in response to that the detected temperature from the sensors 510 and 520 reaches a range from about 150° C. to about 224° C.

At block S104, the droplet generator is opened. For example, as illustrated in FIG. 4, the cover 232 of the droplet generator 230 can be dismantled from the outer shell 237 at the target temperature not lower than 150° C. using the DG opening/closing robot arm 910. In some embodiments, the robot controller 916 is programmed to control the gripper 915 to dismantle the cover 232 from the outer shell 237 after the cooling operation of block S103 is terminated. For example, the droplet generator opening operation relies upon the detected temperature from the sensors 510 and 520 in the droplet generator 230. In particular, the gripper 915 is triggered to dismantle the cover 232 from the outer shell 237 in response to that the detected temperature from the sensors 510 and 520 reaches a range from about 150° C. to about 224° C. In some other embodiments, the droplet generator 230 is opened manually by an experienced human user who uses a thermal insulator tool.

At block S105, the droplet generator is refilled. For example, as illustrated in FIG. 4, the opened droplet generator 230 can be refilled at the temperature not lower than about 150° C. by inserting a bar-shaped solid target material BT into the reservoir 231 of the opened droplet generator 230 using the DG refilling robot arm 920. In some embodiments, the robot controller 926 is programmed to trigger the gripper 925 to insert the bar-shaped solid target material BT into the reservoir 231 after the cover 232 is dismantled from the outer shell 237. In some other embodiments, the droplet generator 230 is refilled manually by an experienced human user who uses a thermal insulator tool.

At block S106, the droplet generator is closed. For example, as illustrated in FIG. 4, the cover 232 is assembled to the outer shell 237 at the target temperature not lower than 150° C. by using the DG opening/closing robot arm 910, so as to close the droplet generator 230. In some embodiments, the robot controller 916 is programmed to trigger the gripper 915 to assemble the cover 232 to the outer shell 237 after the droplet generator 230 is refilled. In some other embodiments, the droplet generator 230 is closed manually by an experienced human user who uses a thermal insulator tool. In some embodiments, after refilling the droplet generator 230 and before closing the droplet generator 230, the reservoir 231 in the droplet generator 230 may be vacuumed by a vacuum pump (not shown). In this way, oxygen and moisture can be drawn away from the reservoir 231, thus extending lifetime of the droplet generator 230.

At block S107, the droplet generator is reheated. For example, the droplet generator 230 can be reheated from the temperature not lower than 150° C. using the heating elements 236*a*, 236*b*, and/or the temperature control system 300 as illustrated in FIG. 3, 5, 6, 7 or 8. In some embodiments, the temperature controller 400 is programmed to control the heating elements 236*a*, 236*b*, and/or the temperature control system 300 to trigger the reheating operation after the droplet generator 230 is closed. In some embodiments, before reheating the droplet generator 230, the droplet generator 230 can be optionally inspected manually or automatedly to ensure there is no leakage in the closed droplet generator 230.

In some embodiments, the temperature controller 400 is programmed to control the heating elements 236*a*, 236*b*, and/or the temperature control system 300 to terminate the reheating operation at the target temperature higher than a melting point (about 231° C.) of the bar-shaped target material BT (e.g., tin). In some embodiments, the termination of the reheating operation relies upon the detected temperature from the sensors 510 and 520 in the droplet generator 230. In particular, the reheating operation terminates in response to that the detected temperature from the sensors 510 and 520 reaches a range from about 231° C. to about 300° C., or up to about 2602° C., such that the tin material melts and does not vaporize.

At block S108, the droplet generator is pressurized. For example, as illustrated in FIG. 3, the reservoir 231 of the droplet generator 230 can be pressurized by turning on the pressurizing device PC while turning off the depressurizing device DC. In this way, the droplet generator 230 can eject the molten target droplets TD toward the zone of excitation ZE.

At block S109, the laser source is turned on. For example, as illustrated in FIG. 2, the laser source 220 is turned on by the laser controller 222 to resume emission of the excitation laser LB. In this way, the laser source 220 can emit excitation laser LB toward the zone of excitation ZE and thus heat the target droplets TD and result in EUV radiation EL. In this way, the EUV lithography process is resumed. In some embodiments, before turning on the laser source 220, the droplet generator 230 is optionally inspected manually or automatedly to ensure that the droplet generator 230 ejects target droplets TD normally. In some embodiments, before turning on the laser source, the vessel 210 may be vacuumed by a vacuum pump (not shown). In this way, oxygen and moisture can be drawn away from the vessel 210, thus extending lifetime of the droplet generator 230 disposed on sidewall of the vessel 210.

Figure 10:
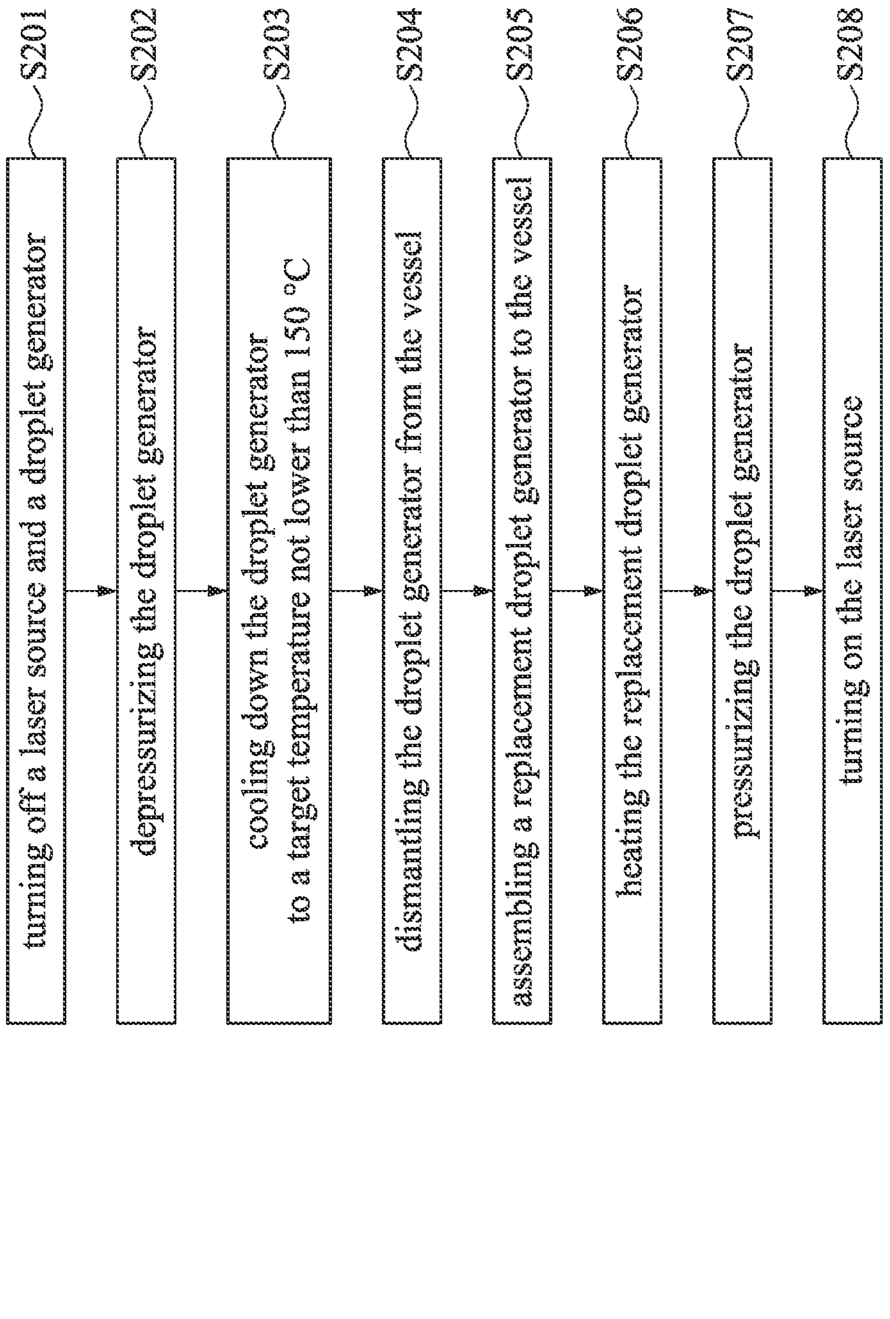
FIG. 10 is a method of a PM operation according to some embodiments of the present disclosure.

FIG. 10 is a method of a PM operation according to some embodiments of the present disclosure, which involves a droplet generator replacement operation (also referred to as a droplet generator swap operation). The illustration is merely exemplary and is not intended to limit beyond what is specifically recited in the claims that follow. It is understood that additional steps may be provided before, during, and after the steps shown by FIG. 10, and some of the steps described below can be replaced or eliminated in additional embodiments of the method. The order of the operations/processes may be interchangeable.

At block S201, the laser source and the droplet generator are turned off. For example, as illustrated in FIG. 2, the laser source 220 is turned off by the laser controller 222, and the droplet generator 230 is turned off by stopping pressurizing the droplet generator 230 by turning off the pressuring device PC as illustrated in FIG. 3. Other details of block S201 is similar as those described in block S101 and thus are not repeated for the sake of brevity.

At block S202, the droplet generator is depressurized. For example, as illustrated in FIG. 3, the droplet generator 230 can be depressurized by turning on the depressurizing device DC while turning off the pressurizing device PC.

At block S203, the droplet generator is cooled down to a target temperature not lower than 150° C. For example, the droplet generator 230 can be cooled down using the temperature control system 300 as illustrated in FIG. 3, 5, 6, 7 or 8. Other details of block S203 is similar as those described in block S103 and thus are not repeated for the sake of brevity.

At block S204, the droplet generator is dismantled from the vessel. For example, as illustrated in FIG. 2, the droplet generator 230 is dismantled from the cover 212 of the vessel 210 at the temperature not lower than 150° C. In some embodiments, the droplet generator 230 can be dismantled from the vessel 210 by using a robot arm 910 or 920 as illustrated in FIG. 4. In some embodiments, a robot controller is programmed to control the gripper 915 or 925 to dismantle the droplet generator 230 from the vessel 210 after the cooling operation of block S203 is terminated. For example, the droplet generator opening operation relies upon the detected temperature from the sensors 510 and 520 in the droplet generator 230. In particular, the gripper 915 or 925 is triggered to dismantle the droplet generator 230 from the vessel 210 in response to that the detected temperature from the sensors 510 and 520 reaches a range from about 150° C. to about 224° C. In some other embodiments, the droplet generator 230 can be dismantled from the vessel 210 manually by an experienced human user who uses a thermal insulating tool. In some embodiments, the dismantling operation is performed in a low oxygen and low moisture environment to extend lifetime of the droplet generator. For example, the dismantling operation is performed in a vacuum environment. In greater detail, the atmosphere around the droplet generator 230 may be vacuumed by a vacuum pump (not shown) before dismantling the droplet generator 230 from the vessel 210. In this way, oxygen and moisture can be drawn away from the atmosphere around the droplet generator 230 by the vacuum pump.

At block S205, another droplet generator filled with the target material is assembled to the vessel. For example, as illustrated in FIG. 2, after the previous droplet generator 230 is dismantled from the vessel 210, a next droplet generator 230 (interchangeably referred to as a replacement droplet generator) filled with target material TM is assembled to the vessel 210 by using, for example, a robot arm 910 or 920 as illustrated in FIG. 4. In some other embodiments, the replacement droplet generator 230 can be assembled to the vessel 210 manually by an experienced human user who uses a thermal insulating tool. In some embodiments, the assembling operation is performed in a low oxygen and low moisture environment to extend lifetime of the replacement droplet generator. For example, the replacement operation is performed in a vacuum environment. In some embodiments, after assembling the replacement droplet generator 230 to the vessel 210, the reservoir 231 in the replacement droplet generator 230 may be vacuumed by a vacuum pump (not shown). In this way, oxygen and moisture can be drawn away from the reservoir 231, thus extending lifetime of the replacement droplet generator 230.

At block S206, the replacement droplet generator is heated. For example, the replacement droplet generator 230 can be heated using the heating elements 236*a*, 236*b* and/or the temperature control system 300 as illustrated in FIG. 3, 5, 6, 7 or 8. Other details of block S206 is similar as those described in block S107 and thus are not repeated for the sake of brevity.

At block S207, the droplet generator is pressurized. For example, as illustrated in FIG. 3, the replacement droplet generator 230 can be pressurized by turning on the pressurizing device PC while turning off the depressurizing device DC. In this way, the droplet generator 230 can eject the molten target droplets TD toward the zone of excitation ZE.

At block S208, the laser source is turned on. For example, as illustrated in FIG. 2, the laser source 220 is turned on by the laser controller 222. In this way, the laser source 220 can emit excitation laser toward the zone of excitation ZE and thus heat the target droplets TD and result in EUV radiation EL. In this way, the EUV lithography process is resumed. In some embodiments, before turning on the laser source, the vessel 210 may be vacuumed by a vacuum pump (not shown). In this way, oxygen and moisture can be drawn away from the vessel 210, thus extending lifetime of the droplet generator 230 disposed on sidewall of the vessel 210.

Figure 11:
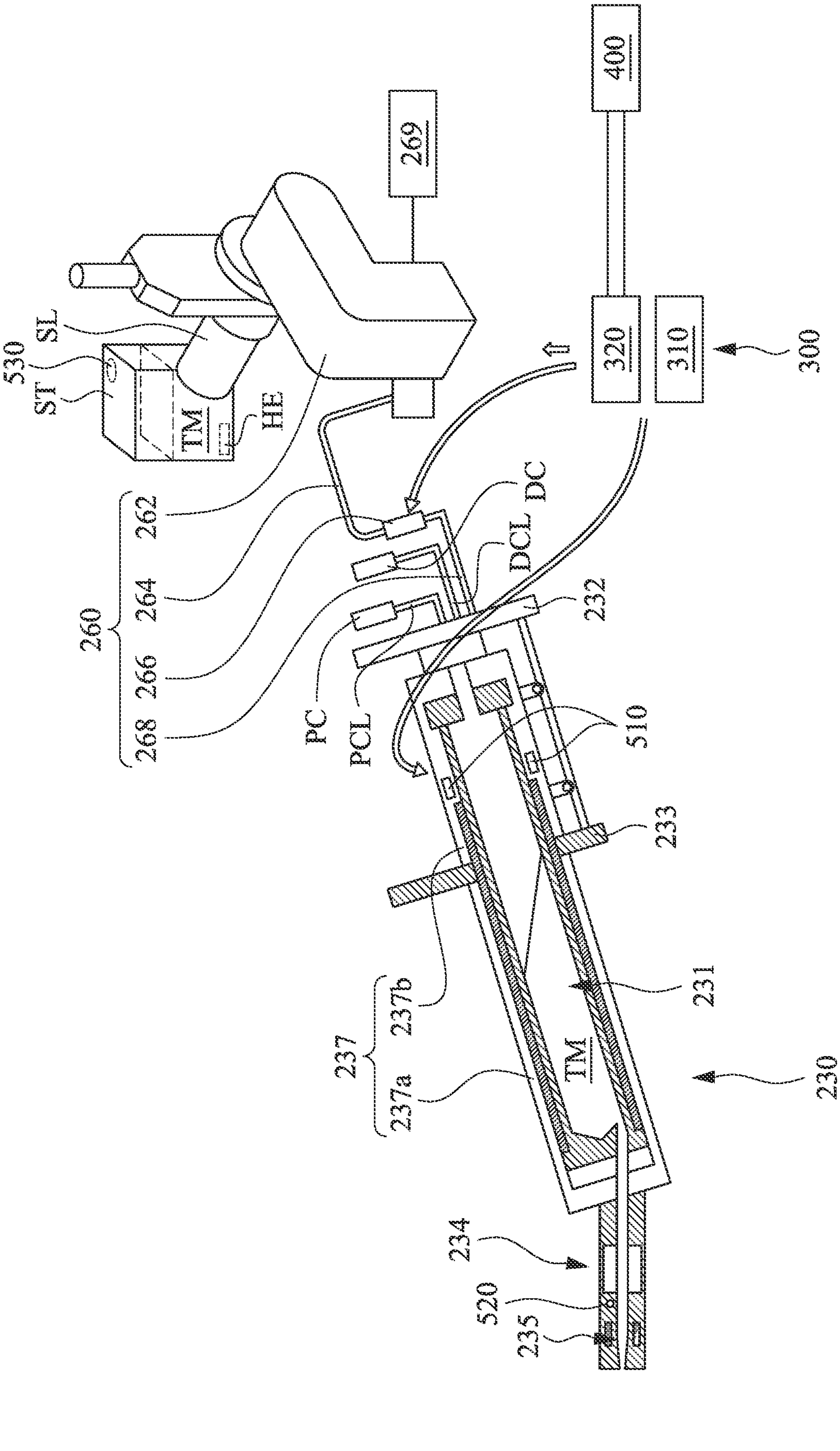
FIG. 11 is a schematic view of a droplet generator assembly according to some embodiments of the present disclosure.

FIG. 11 is a schematic view of a droplet generator assembly according to some embodiments of the present disclosure. The droplet generator assembly of the present embodiments is similar to the droplet generator assembly in FIG. 3, except that the droplet generator assembly may further include an in-line refill system 260 and a storage tank ST in the present embodiments.

The storage tank ST is configured to contain the target material TM. The target material TM in the storage tank ST is supplied to the droplet generator 230 via the in-line refill system 260. The in-line refill system 260 may include a low-pressure vessel 262, a refill line 264, a high-pressure vessel 266, and a transfer line 268. The low-pressure vessel 262 is coupled to the storage tank ST through a supply line SL. The refill line 264 connects the low-pressure vessel 262 to the high-pressure vessel 266 which has a higher gas pressure than the low-pressure vessel 262. The transfer line 268 connects the high-pressure vessel 266 to the droplet generator 230. The in-line refill system 260 may further include pumps and valves (not shown) connected to the vessels 262 and 266 of the in-line refill system 260 to control the pressures in the vessels 262 and 266, thereby controlling the flow of molten target material TM. When the in-line refill system 260 performs an in-line refilling operation, the target material TM in the storage tank ST is heated using, for example, one or more heating elements HE in the storage tank ST, to a temperature above the melting point of the target material TM, followed by pumping the molten target material TM to the low-pressure vessel 262 through the supply line SL and then to the high-pressure vessel 266 through the refill line 264. Thereafter, a pressure in the high-pressure vessel 266 can be controlled for directing the molten target material TM from the high-pressure vessel 266 into the reservoir 231 of the droplet generator 230. For example, the high-pressure vessel 266 may include a gas inlet and a gas outlet, and by continuously supplying gas into the vessel 266 through the gas inlet by pump(s) and blocking the gas outlet, the pressure in the vessel 266 increases to higher than the pressure in the reservoir 231. In this way, the molten target material TM in the vessel 266 can be forced out of the vessel 266 and into the reservoir 231 through the transfer line 268.

During the EUV lithography process, the pressurizing device PC pressurizes the molten target material TM from the reservoir 231 into the tube 234 for eject droplets of the target material TM. Moreover, an in-line refill controller 269 is programmed to trigger the in-line refilling operation during the EUV lithography process (i.e., during ejecting droplets of the target material TM). In other words, the molten target material TM in the storage tank ST is delivered to the reservoir 231 by using the in-line refill system 260 when the droplet generator 230 ejects droplets of the target material TM. As a result, the droplet generator 230 can be refilled in an in-line manner without stopping ejecting droplets. In some embodiments, the in-line refill controller 269 may include a processor, a central processing unit (CPU), a multi-processor, a distributed processing system, an application specific integrated circuit (ASIC), or the like.

As described above, the temperature control system 300 may include a heat sink 310 and a fan 320. The controller 400 is connected to the fan 320 for controlling the operation of the fan 320. The temperature control system 300 (e.g., including the heat sink 310 and/or the fan 320) may be over the exterior portion 237*b* of the outer shell 237, the transfer line 268, a portion of a sidewall of the high-pressure vessel 266, and/or a portion of a sidewall of the low-pressure vessel 262. That is, the temperature control system 300 may be used to control a temperature of the refill system 260. Other details of the present embodiments are similar to those described above, and not repeated for the sake of brevity.

Figure 12:
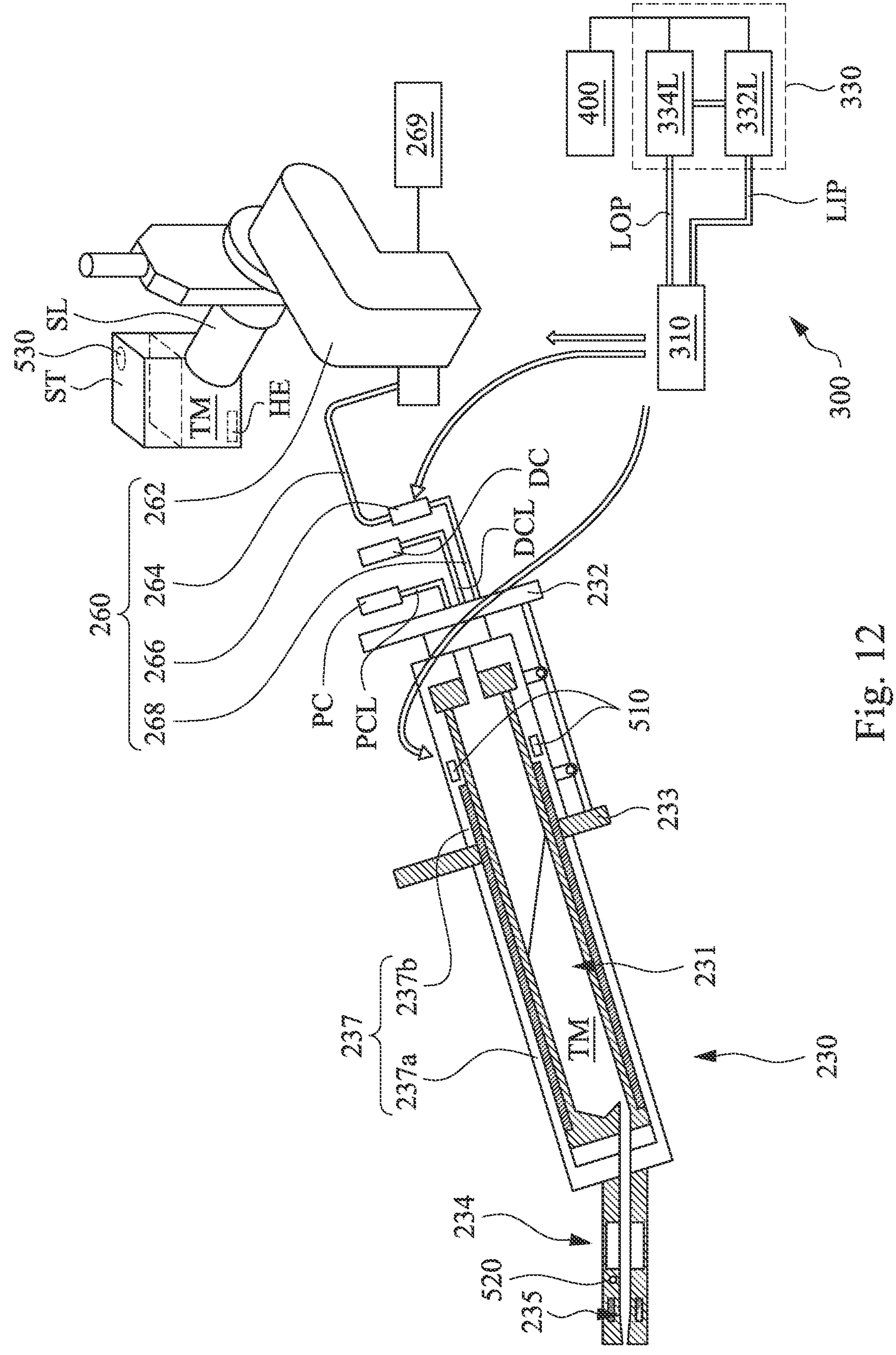
FIG. 12 is a schematic view of a droplet generator assembly according to some embodiments of the present disclosure.

FIG. 12 is a schematic view of a droplet generator assembly according to some embodiments of the present disclosure. The present embodiments are similar to the embodiments of FIG. 11, except that the temperature control system 300 as shown in FIG. 12 may include liquid pipes LIP and LOP and a temperature control device 330 fluidly communicated with the liquid pipes LIP and LOP. The temperature control device 330 includes a liquid tank 332L and a liquid heating/cooling element 334L as those mentioned in FIG. 5. The temperature control system 300 (e.g., the heat sink 310 and the liquid pipes LIP and LOP) may be near or over the exterior portion 237*b* of the outer shell 237, the transfer line 268, a portion of a sidewall of the high-pressure vessel 266, and/or a portion of a sidewall of the low-pressure vessel 262. For example, the heat sink 310 and the liquid pipes LIP and LOP may be connected to or in contact with the exterior portion 237*b* of the outer shell 237, the transfer line 268, a portion of a sidewall of the high-pressure vessel 266, and/or a portion of a sidewall of the low-pressure vessel 262. Other details of the present embodiments are similar to those discussed previously, and thus not repeated for the sake of brevity.

Figure 13:
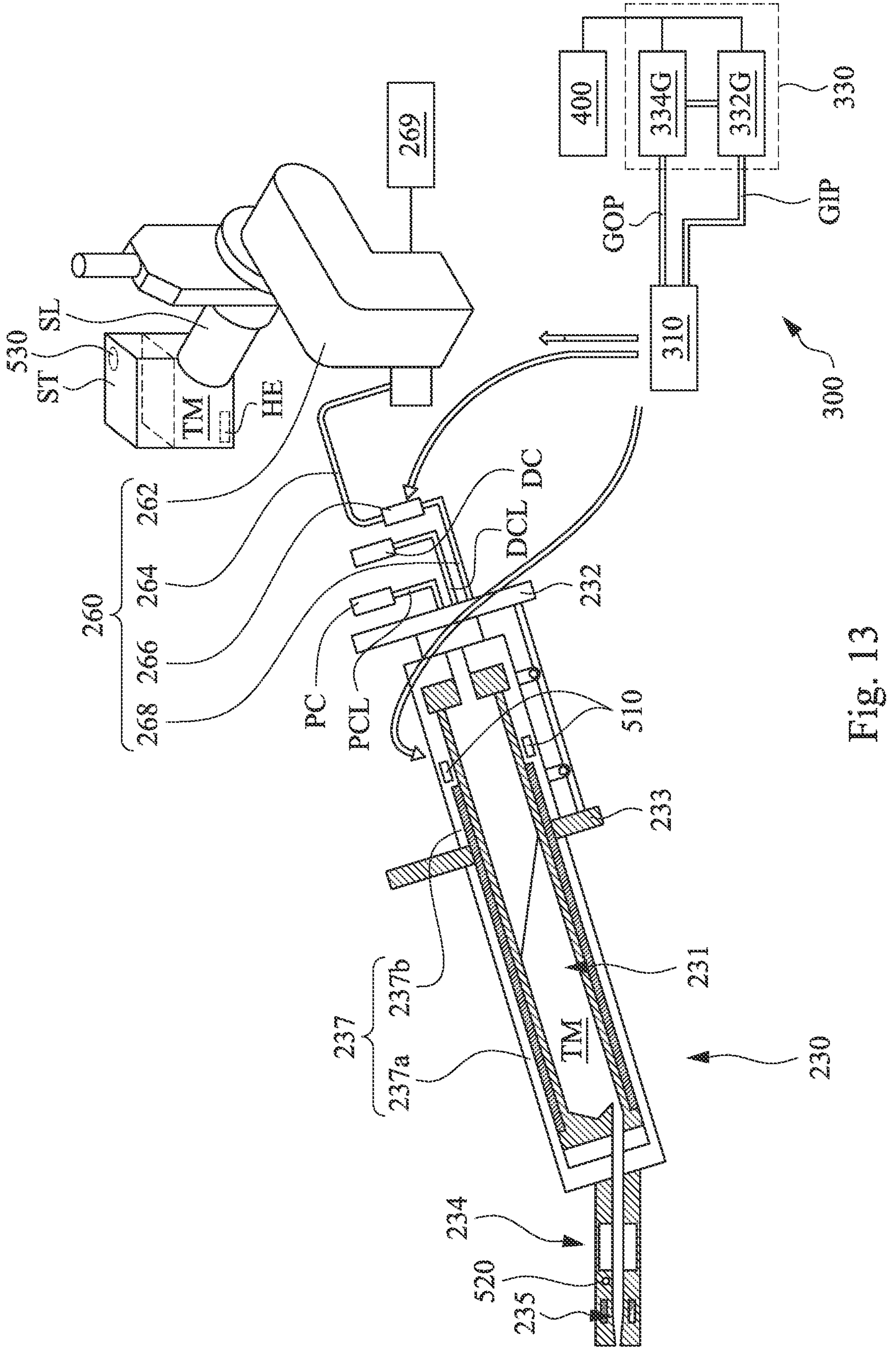
FIG. 13 is a schematic view of a droplet generator assembly according to some embodiments of the present disclosure.

FIG. 13 is a schematic view of a droplet generator assembly according to some embodiments of the present disclosure. The present embodiments are similar to the embodiments of FIG. 11, except the temperature control system 300 in FIG. 13 includes gas pipes GIP and GOP and a temperature control device 330 fluidly communicated with the gas pipes GIP and GOP. The temperature control device 330 includes a gas tank 332G and a gas heating/cooling element 334G as those described with respect to FIG. 6. The temperature control system 300 (e.g., the heat sink 310 and the gas pipes GIP and GOP) may be near or over the exterior portion 237*b* of the outer shell 237, the transfer line 268, a portion of a sidewall of the high-pressure vessel 266, and/or a portion of a sidewall of the low-pressure vessel 262. For example, the heat sink 310 and the gas pipes GIP and GOP may be connected to or in contact with the exterior portion 237*b* of the outer shell 237, the transfer line 268, a portion of a sidewall of the high-pressure vessel 266, and/or a portion of a sidewall of the low-pressure vessel 262. Other details of the present embodiments are similar to those discussed previously, and thus not repeated for the sake of brevity.

Figure 14:
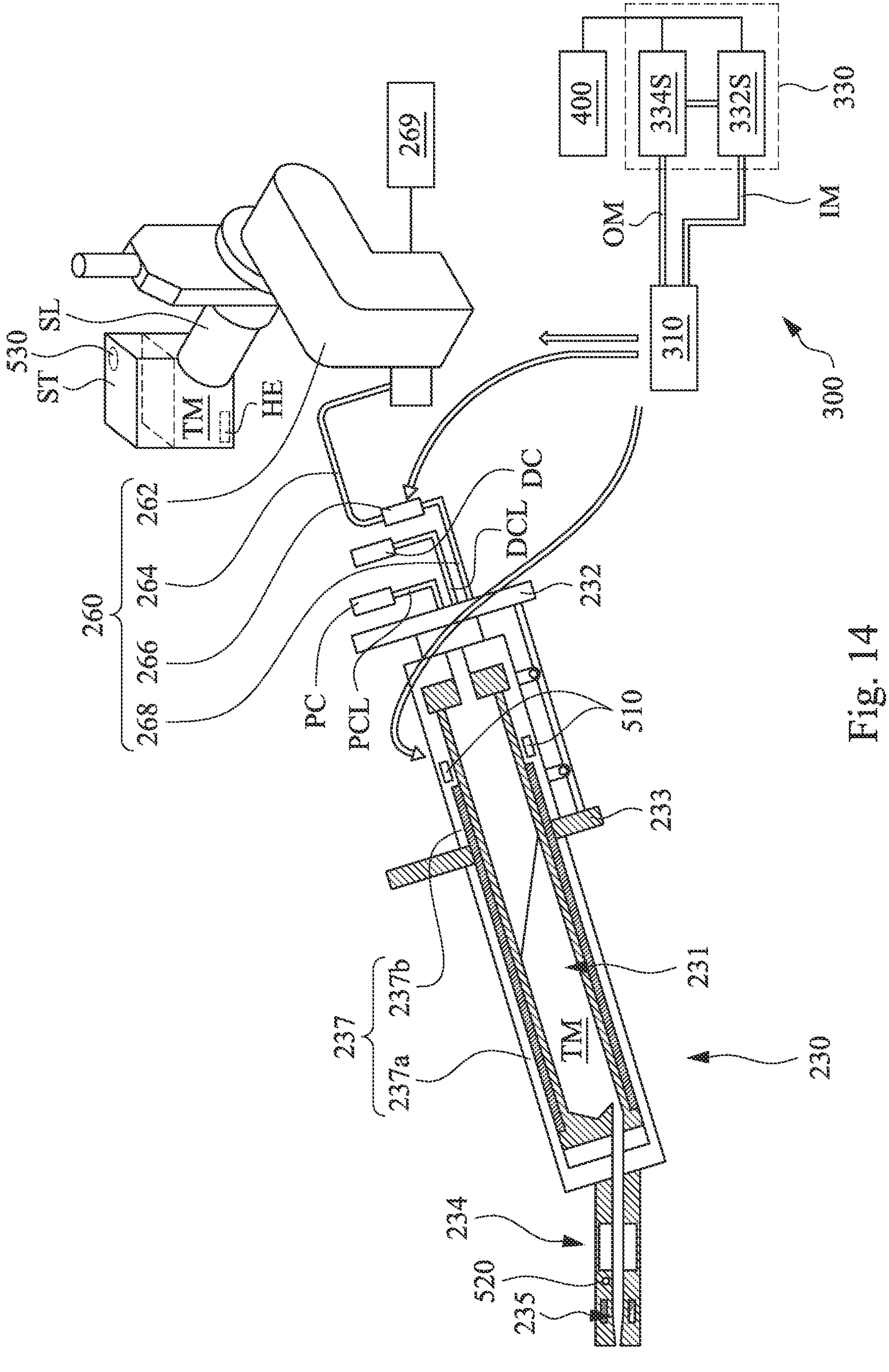
FIG. 14 is a schematic view of a droplet generator assembly according to some embodiments of the present disclosure.

FIG. 14 is a schematic view of a droplet generator assembly according to some embodiments of the present disclosure. The present embodiments are similar to the embodiments of FIG. 11, except that the temperature control system 300 may include wires IM and OM and a temperature control device 330 connected with the wires IM and OM. The temperature control device 330 includes a solid tank 332S and a solid heating/cooling element 334S as those described in FIG. 7. The temperature control system 300 (e.g., the heat sink 310 and the wires IM and OM) may be near or over the exterior portion 237*b* of the outer shell 237, the transfer line 268, a portion of a sidewall of the high-pressure vessel 266, and/or a portion of a sidewall of the low-pressure vessel 262. For example, the heat sink 310 and the wires IM and OM may be connected to or in contact with the exterior portion 237*b* of the outer shell 237, the transfer line 268, a portion of a sidewall of the high-pressure vessel 266, and/or a portion of a sidewall of the low-pressure vessel 262. Other details of the present embodiments are similar to those discussed previously, and thus not repeated for the sake of brevity.

Figure 15:
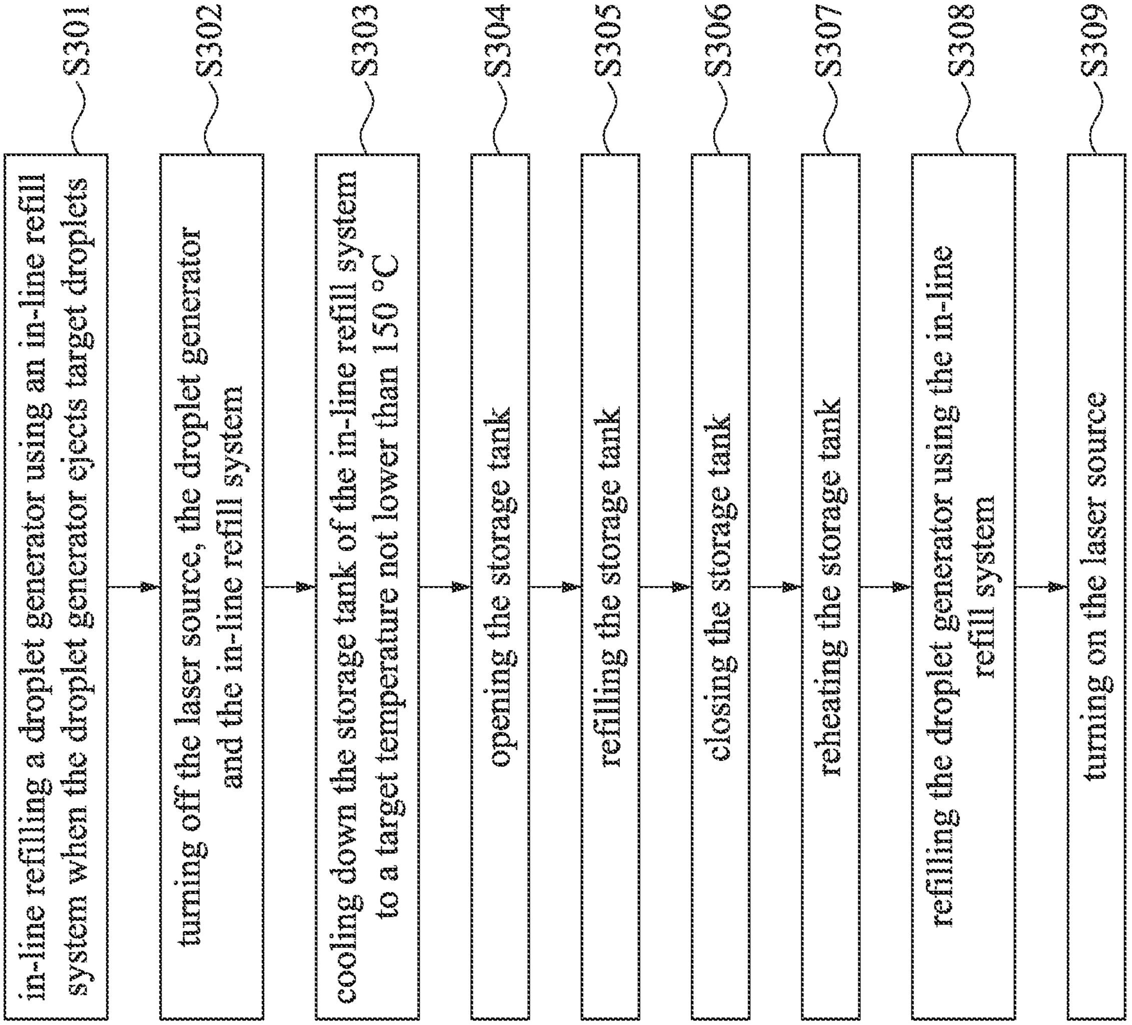
FIG. 15 is a method of a PM operation according to some embodiments of the present disclosure.

FIG. 15 is a method of a PM operation according to some embodiments of the present disclosure. The illustration is merely exemplary and is not intended to limit beyond what is specifically recited in the claims that follow. It is understood that additional steps may be provided before, during, and after the steps shown by FIG. 15, and some of the steps described below can be replaced or eliminated in additional embodiments of the method. The order of the operations/processes may be interchangeable. At block S301, the droplet generator is in-line refilled using an in-line refill system when the droplet generator ejects target droplets. For example, as illustrated in FIGS. 11-14, the in-line refilled system 260 delivers the molten target material TM (e.g., molten tin) from the storage tank ST to the reservoir 231 by using the in-line refill system 260 during the pressurizing device PC pressurizes the molten target material TM in the reservoir 231 to eject droplets of the target material TM through the nozzle 235.

At block S302, the laser source, the droplet generator and the in-line refill system are turned off. For example, as illustrated in FIG. 2, the laser source 220 is turned off by the laser controller 222. Moreover, as illustrated in FIG. 11, the droplet generator 230 is turned off by stopping pressurizing the droplet generator 230 by turning off the pressuring device PC, and the in-line refill system 260 is turned off by the in-line refill controller 269.

At block S303, the storage tank of the in-line refill system is cooled down to a target temperature not lower than 150° C. For example, the storage tank ST of the in-line refill system 260 can be cooled down using the temperature control system 300, as illustrated in FIG. 11, 12, 13 or 14.

At block S304, the storage tank of the in-line refill system is opened. For example, the storage tank ST as illustrated in FIG. 11, 12, 13 or 14 can be opened at the temperature not lower than 150° C. automatedly by using a robot arm such as a robot arm 910 as illustrated in FIG. 4. In some embodiments, the robot controller 916 of the robot arm 910 is programmed to control the gripper 915 to open the storage tank ST after the cooling operation of block S303 is terminated. For example, the storage tank opening operation relies upon the detected temperature from a temperature sensor 530 in the storage tank ST. In particular, the gripper 915 is triggered to open the storage tank ST in response to that the detected temperature from the sensor 530 reaches a range from about 150° C. to about 224° C. In some other embodiments, the storage tank ST can be opened manually by an experienced human user who uses a thermal insulating tool.

At block S305, the storage tank of the in-line refill system is refilled. For example, as illustrated in FIGS. 11-14, after the storage tank ST is opened, the storage tank ST can be refilled with a solid target material TM at the temperature not lower than about 150° C. automatedly using, for example, the robot arm 920 as illustrated in FIG. 4. In some other embodiments, the storage tank ST can be refilled manually by an experienced human user using a thermal insulating tool.

At block S306, the storage tank of the in-line refill system is closed. For example, as illustrated in FIGS. 11-14, after putting the solid target material TM into the storage tank ST at block S305, the storage tank ST can be closed at the temperature not lower than 150° C. automatedly by using a robot arm such as the robot arm 910 as illustrated in FIG. 4. In some other embodiments, the storage tank ST can be refilled manually by an experienced human user using a thermal insulating tool.

At block S307, the storage tank is reheated. For example, the storage tank ST can be reheated from the temperature not lower than 150° C. to a temperature higher than the melting point of the target material TM to melt the solid target material TM by using, for example, the one or more heating elements HE in the storage tank ST and/or the temperature control system 300, as illustrated in FIG. 11, 12, 13 or 14.

At block S308, the droplet generator is refilled using the in-line refilled system. For example, as illustrated in FIGS. 11-14, the molten target material TM can be delivered from the storage tank ST to the reservoir 231 of the droplet generator 230 using the in-line refill system 260.

At block S309, the laser source is turned on. For example, as illustrated in FIG. 2, the laser source 220 is turned on by the laser controller 222. In this way, the laser source 220 can emit excitation laser toward the zone of excitation ZE and thus heat the target droplets TD and result in EUV radiation EL. In this way, the EUV lithography process is resumed.

Figure 16B:
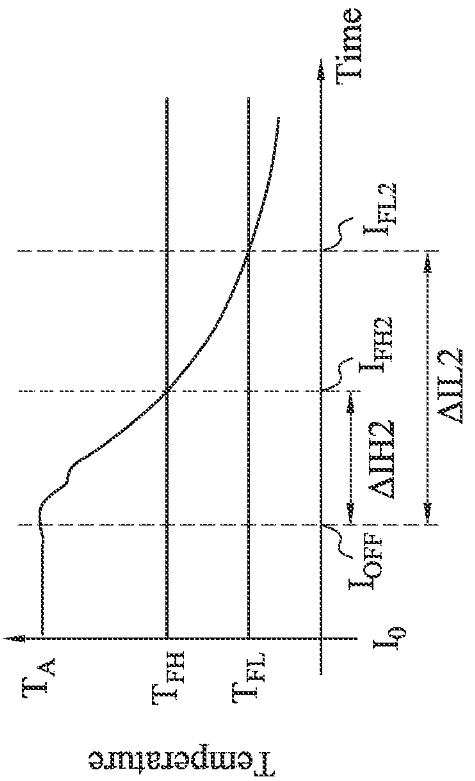
FIGS. 16A and 16B are experiment results according to some embodiments of the present disclosure.
Figure 16A:
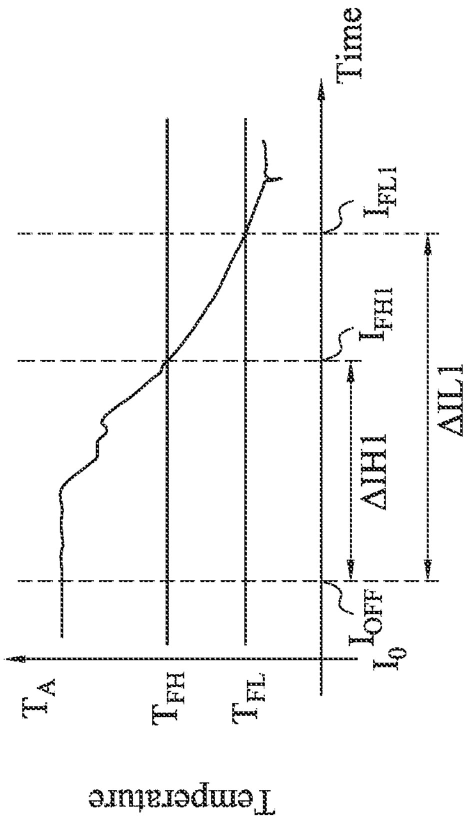

FIG. 16A is an experiment result of naturally cooling a droplet generator according to some embodiments of the present disclosure. FIG. 16B is an experiment result of cooling a droplet generator with a fan (e.g., fan 320 in FIG. 3) according to some embodiments of the present disclosure. At timing $I_0$, the droplet generator assembly ejects target droplets at a temperature $T_A$ above a melting point of the target material (e.g., tin). At timing $I_{OFF}$, the droplet generator assembly stops ejecting target droplets, the heating elements 236*a* and 236*b* are turned off, and a temperature of the reservoir of the droplet generator starts to decrease. The high refilling temperature $T_{FH}$ is a high temperature (e.g., from about 150° C. to about 224° C.) that a refilling process is performed. The low refilling temperature $T_{FL}$ is a low temperature (e.g., 25° C.) that another refilling process is performed.

In FIG. 16A, it takes a time duration Δ IH1 for naturally decreasing the temperature of the reservoir of the droplet generator from the temperature $T_A$ to the high refilling temperature $T_{FH}$, and a time duration Δ IL1 for naturally decreasing the temperature of the reservoir of the droplet generator from the temperature $T_A$ to the low refilling temperature $T_{FL}$. It is clear that the time duration ΔIH1 is shorter than the time duration Δ ILL so that the PM operation can be effectively shortened when performing a refilling operation at a temperature not lower than 150° C., even if the PM operation uses a natural cooling operation.

In FIG. 16B, with the temperature control system (e.g., the fan and the heat sink), it takes a time duration ΔIH2 for decreasing the temperature of the reservoir from the temperature $T_A$ to the high refilling temperature $T_{FH}$, and a time duration Δ IL2 for decreasing the temperature of the reservoir of the droplet generator from the temperature $T_A$ to the low refilling temperature $T_{FL}$. It is clear that the time duration ΔIH2 is shorter than the time duration Δ IL2, so that the PM operation involving an active cooling operation can be effectively shortened when performing a refilling operation at a temperature not lower than 150° C.

Moreover, comparing the time duration ΔIH2 as shown in FIG. 16B with the time duration ΔIH1 as shown in FIG. 16A, it is clear that with the temperature control system (e.g., the fan and the heat sink), the cooling operation can take less time duration, which in turn will effectively shorten the PM operation.

Based on the above discussions, it can be seen that the present disclosure offers advantages. It is understood, however, that other embodiments may offer additional advantages, and not all advantages are necessarily disclosed herein, and that no particular advantage is required for all embodiments. One advantage is that cooling and reheating operations in the PM operation take less process time, such that the yield rate is increased. Another advantage is that the contamination or particles in the EUV vessel or on the collector can be effectively reduced due to the shortened PM time duration. Still another advantage is that, due to the shortened PM time, unwanted oxidation of the target material caused oxygen-containing gases (e.g., $O_2$, $H_2O$) during the PM operation can be reduced.

According to some embodiments of the present disclosure, a method includes ejecting a metal droplet from a reservoir of a droplet generator toward a zone of excitation in front of a collector, emitting an excitation laser toward the zone of excitation, such that the metal droplet is heated by the excitation laser to generate extreme ultraviolet (EUV) radiation, halting the emission of the excitation laser, depressurizing the reservoir of the droplet generator, cooling down the droplet generator to a temperature not lower than about 150° C., and refilling the reservoir of the droplet generator with a solid metal material at the temperature not lower than about 150° C.

According to some embodiments of the present disclosure, a method includes ejecting a metal droplet from a reservoir of a first droplet generator assembled to a vessel, emitting an excitation laser to the metal droplet to generate extreme ultraviolet (EUV) radiation, turning off the first droplet generator, cooling down the first droplet generator to a temperature not lower than about 150° C., dismantling the first droplet generator from the vessel at the temperature at the temperature not lower than about 150° C., and assembling a second droplet generator to the vessel.

According to some embodiments of the present disclosure, an apparatus includes a droplet generator, a storage tank, an in-line refill system, an in-line refill controller, a first robot arm and a first robot controller. The droplet generator includes a reservoir and a nozzle fluidly communicated with the reservoir. The in-line refill system is connected between the storage tank and the reservoir of the droplet generator. The in-line refill controller controls the in-line refill system to deliver a target material from the storage tank to the reservoir when the droplet generator ejects a droplet of the target material through the nozzle. The first robot controller controls the first robot arm to open the storage tank in response to a temperature of the storage tank being lower than a melting point of tin but not lower than about 150° C.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:

receiving a photoresist-coated substrate to an extreme ultraviolet (EUV) tool;

directing an EUV radiation from a radiation source onto the photoresist-coated substrate, wherein the EUV radiation is generated by an excitation laser hitting a plurality of target droplets ejected from a first droplet generator; and replacing the first droplet generator with a second droplet generator at a temperature not lower than about 150° C.

2. The method of claim 1, further comprising:

depressurizing the first droplet generator prior to replacing the first droplet generator with the second droplet generator.

3. The method of claim 1, further comprising:

heating the second droplet generator after replacing the first droplet generator with the second droplet generator.

4. The method of claim 3, further comprising:

pressurizing the second droplet generator after heating the second droplet generator.

5. The method of claim 4, further comprising:

turning on a laser source of the excitation laser after pressurizing the second droplet generator.

6. The method of claim 1, wherein replacing the first droplet generator with the second droplet generator is performed automatedly.

7. The method of claim 1, further comprising:

turning off a laser source of the excitation laser prior to replacing the first droplet generator with the second droplet generator.

8. The method of claim 1, further comprising:

cooling down the first droplet generator from a first temperature to a second temperature not lower than about 150° C.

9. A method, comprising:

placing a wafer onto a wafer stage within an EUV tool;

ejecting a plurality of metal droplets from an initial droplet generator within a radiation source module;

generating an EUV radiation by hitting the plurality of metal droplets using a excitation laser; and replacing the initial droplet generator with a next droplet generator at a temperature not lower than about 150° C.

10. The method of claim 9, wherein replacing the initial droplet generator with the next droplet generator is performed by using one or more robot arms.

11. The method of claim 10, wherein replacing the initial droplet generator with the next droplet generator comprises:

taking the initial droplet generator away from the radiation source module by using a first robot arm of the one or more robot arms; and placing the next droplet generator into the radiation source module by using a second robot arm of the one or more robot arms.

12. The method of claim 9, further comprising:

drawing oxygen away from an atmosphere around the initial droplet generator prior to replacing the initial droplet generator with the next droplet generator.

13. The method of claim 9, further comprising:

after replacing the initial droplet generator with the next droplet generator, drawing oxygen away from a reservoir of the next droplet generator.

14. A method, comprising:

loading a photoresist-coated wafer onto a wafer stage within an EUV tool;

ejecting a plurality of metal droplets from an initial droplet generator toward a zone of excitation;

emitting an excitation laser from a laser source toward the zone of excitation to generate EUV radiation;

reflecting the EUV radiation from a photomask to the photoresist-coated wafer; and replacing the initial droplet generator with a next droplet generator at a temperature not lower than about 150° C.

15. The method of claim 14, further comprising:

depressurizing the initial droplet generator before replacing the initial droplet generator with the next droplet generator.

16. The method of claim 15, further comprising:

cooling down the initial droplet generator after depressurizing the initial droplet generator.

17. The method of claim 16, wherein cooling down the initial droplet generator stops at the temperature not lower than about 150° C.

18. The method of claim 16, wherein the initial droplet generator is replaced after cooling down the initial droplet generator.

19. The method of claim 14, further comprising:

heating the next droplet generator after replacing the initial droplet generator with the next droplet generator.

20. The method of claim 14, further comprising:

pressurizing the next droplet generator after heating the next droplet generator.

* * * * *